(12) United States Patent
Fujimura

(10) Patent No.: US 8,485,021 B2
(45) Date of Patent: Jul. 16, 2013

(54) MEASURING HEAD FOR AIR MICROMETER

(75) Inventor: Noritaka Fujimura, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 301 days.

(21) Appl. No.: 12/863,612

(22) PCT Filed: Jan. 16, 2009

(86) PCT No.: PCT/JP2009/050505
§ 371 (c)(1),
(2), (4) Date: Sep. 20, 2010

(87) PCT Pub. No.: WO2009/093520
PCT Pub. Date: Jul. 30, 2009

(65) Prior Publication Data
US 2011/0023584 A1   Feb. 3, 2011

(30) Foreign Application Priority Data

Jan. 21, 2008  (JP) .............................. 2008-010169

(51) Int. Cl.
*G01B 13/08* (2006.01)
(52) U.S. Cl.
USPC ........................................................ 73/37.5
(58) Field of Classification Search
USPC ................................................ 73/37.5, 37.9
See application file for complete search history.

(56) References Cited

U.S. PATENT DOCUMENTS

| | | | | |
|---|---|---|---|---|
| 2,712,181 A | * | 7/1955 | Mahlmeister | 33/644 |
| 2,831,263 A | * | 4/1958 | Mahlmeister | 33/611 |
| 4,034,478 A | | 7/1977 | Yager | |
| 4,704,896 A | * | 11/1987 | Parsons | 73/37.9 |
| 5,152,166 A | * | 10/1992 | Brock et al. | 73/37.9 |
| 5,333,488 A | * | 8/1994 | Ramsey et al. | 73/37.5 |

(Continued)

FOREIGN PATENT DOCUMENTS

| | | |
|---|---|---|
| JP | 49-29665 A | 3/1974 |
| JP | 52-112852 U | 8/1977 |

(Continued)

OTHER PUBLICATIONS

Japanese Office Action dated Feb. 14, 2012 with English Translation.

(Continued)

*Primary Examiner* — Leonard Chang
*Assistant Examiner* — Natalie Huls
(74) *Attorney, Agent, or Firm* — Birch, Stewart, Kolasch & Birch, LLP

(57) ABSTRACT

A measuring head is provided for an air micrometer which is capable of measuring an amount of eccentricity between a main spindle and a bush hole. A measuring head (41) includes a measuring-head body portion (42) and a measuring-head tip portion (43), in which: a first measurement air nozzle (51A) and a second measurement air nozzle (51B) are each formed in the measuring-head tip portion to extend in a radial direction of the measuring-head tip portion, and also formed to have an angle of 180 degrees with respect to each other in a circumferential direction of the measuring-head tip portion; individual measurement air supply passages corresponding to the respective measurement air nozzles are formed in the measuring-head body portion; and measurement air is supplied to the measurement air nozzles from the individual measurement air supply passages, respectively.

3 Claims, 17 Drawing Sheets

U.S. PATENT DOCUMENTS

| | | | |
|---|---|---|---|
| 5,787,596 A * | 8/1998 | Mishima et al. | 33/533 |
| 6,243,962 B1 * | 6/2001 | Brock | 33/542 |
| 6,901,797 B2 * | 6/2005 | Hyatt et al. | 73/37.5 |
| 8,087,181 B2 * | 1/2012 | Rogers et al. | 33/654 |
| 2003/0000286 A1 * | 1/2003 | Akerblom | 73/37.5 |
| 2007/0240324 A1 * | 10/2007 | Weier | 33/701 |
| 2011/0000274 A1 * | 1/2011 | Fujimura | 73/1.16 |

FOREIGN PATENT DOCUMENTS

| | | |
|---|---|---|
| JP | 52-137375 A | 11/1977 |
| JP | 58-19209 U | 2/1983 |
| JP | 58-114835 A | 7/1983 |
| JP | 59-17806 U | 2/1984 |
| JP | 61-250507 A | 11/1986 |
| JP | 4-217447 A | 8/1992 |
| JP | 6-186009 A | 7/1994 |
| JP | 7-134018 A | 5/1995 |
| JP | 2006-284376 A | 10/2006 |

OTHER PUBLICATIONS

"Measurement of Hole by Buoy Air Micrometer" Engineer Mechanics, No. 9, pp. 41-45, Dec. 31, 1981 by SD Jing.

Chinese Office Action mailed Sep. 28, 2011 with English Translation.

* cited by examiner

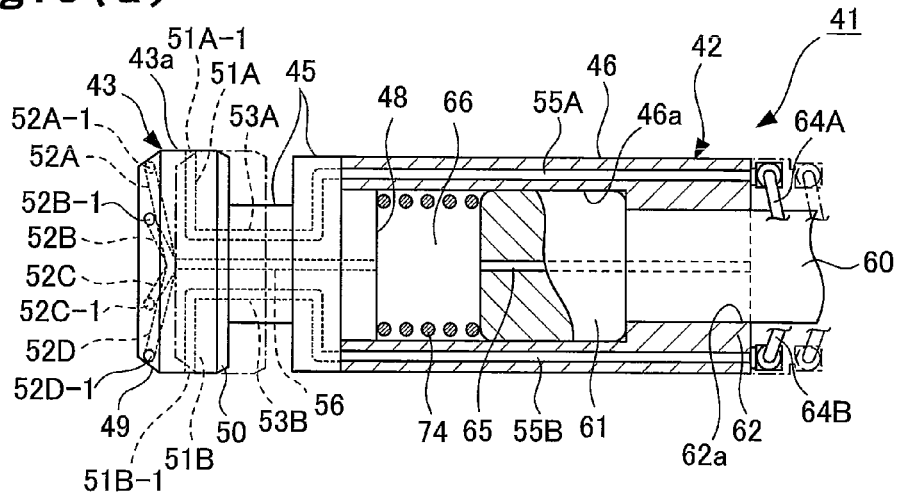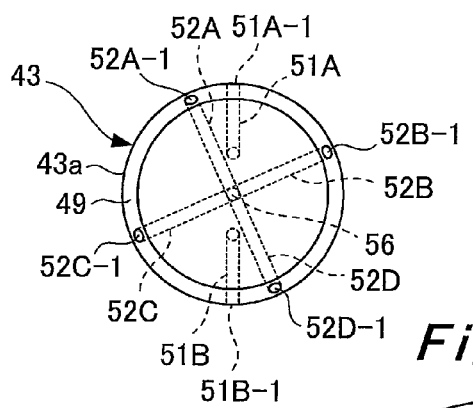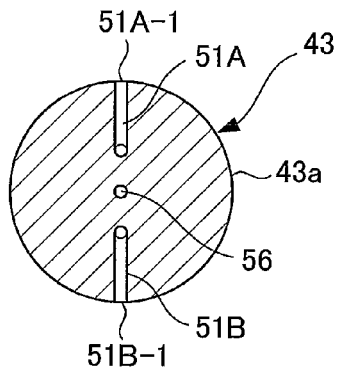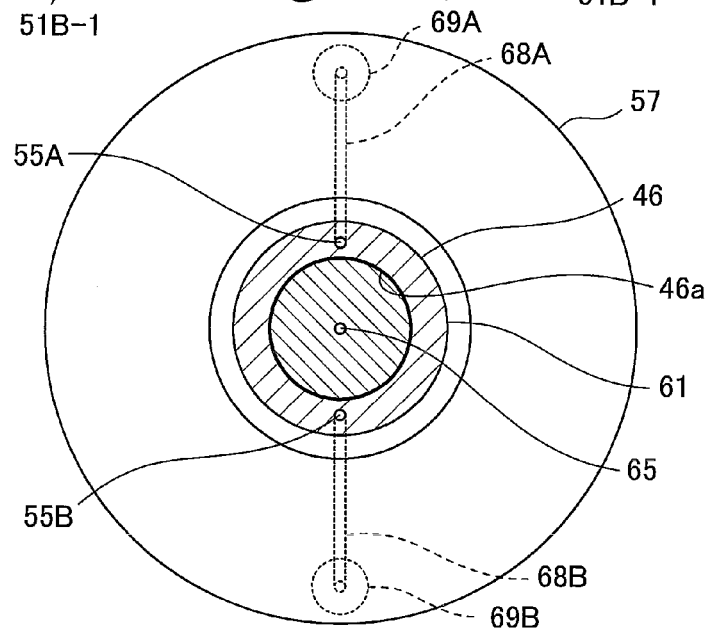

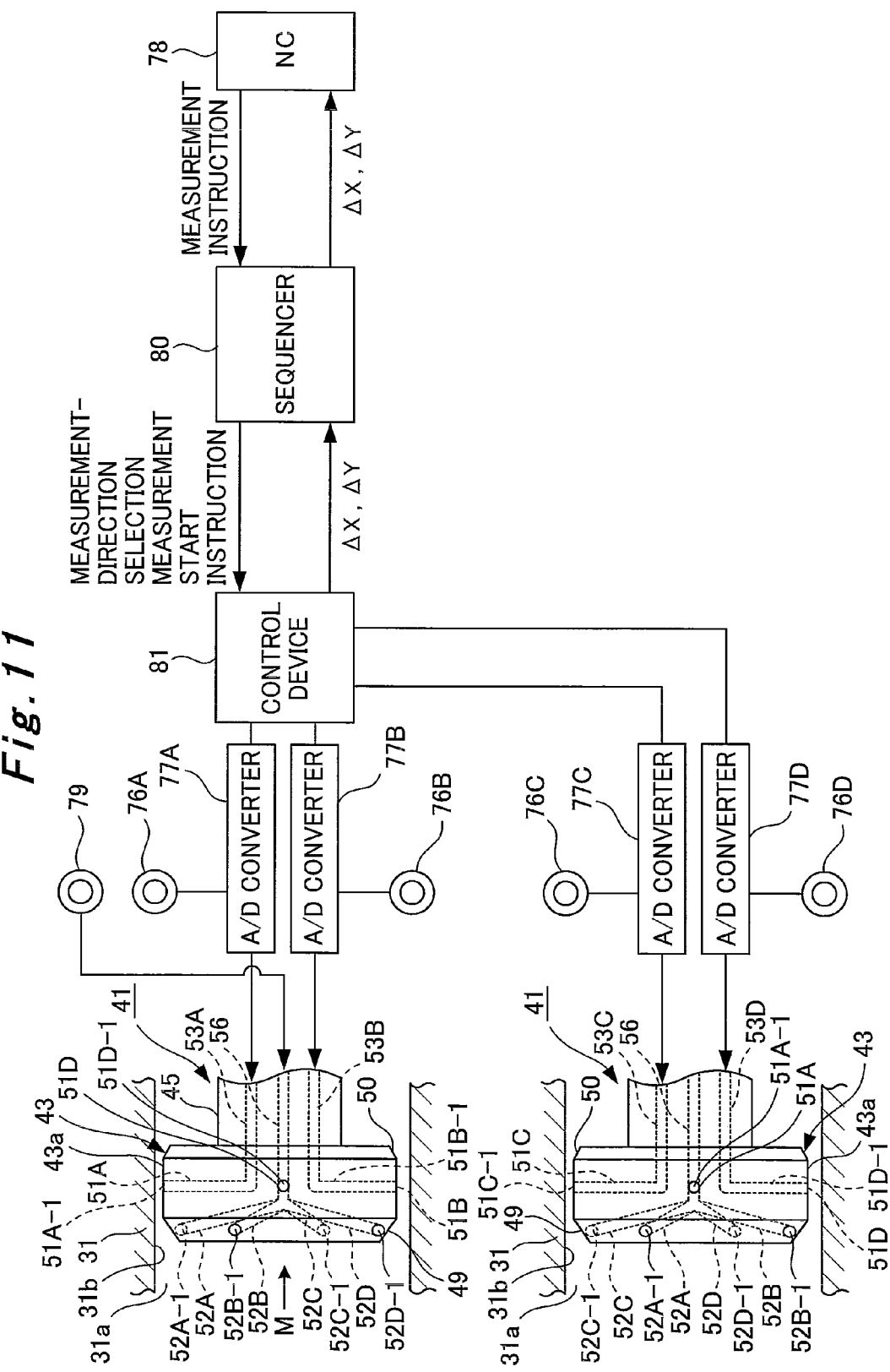

Fig.14(a)
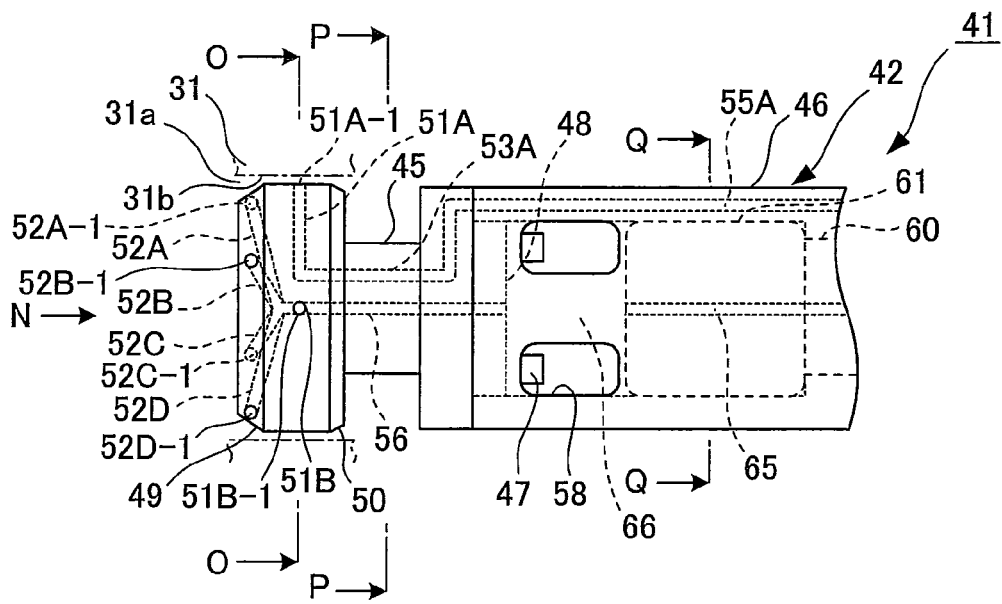
Fig.14(b)
Fig.14(c)
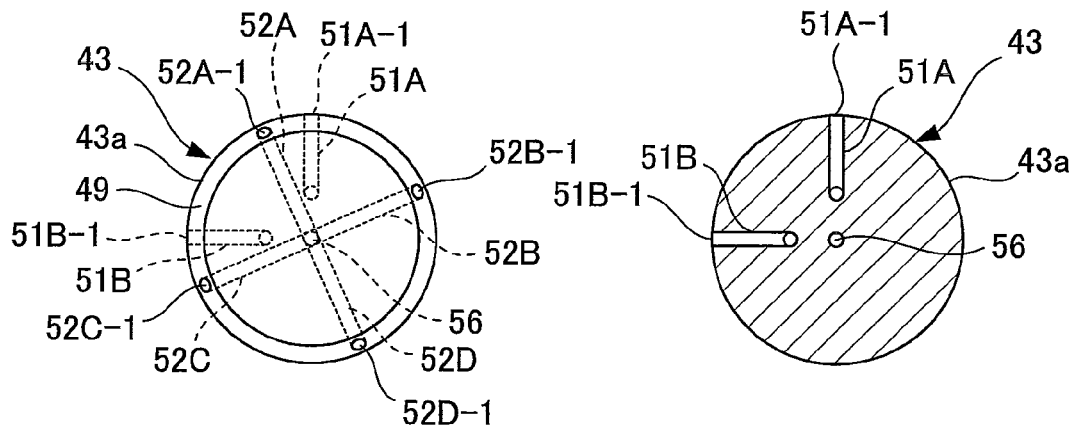
Fig.14(d)
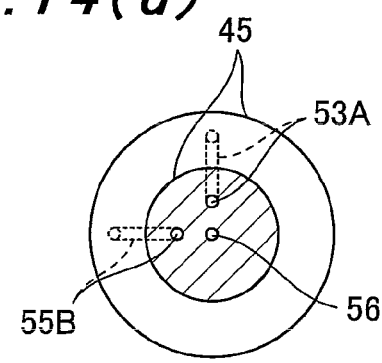
Fig.14(e)
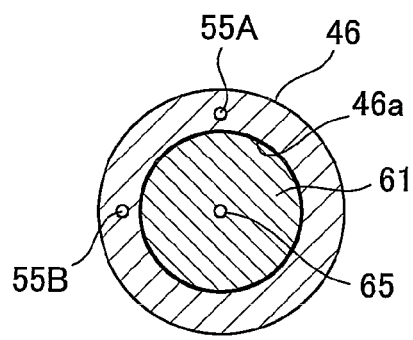

ΔX': AMOUNT OF CHANGE IN GAP IN-AXIS DIRECTION DUE TO INFLUENCE OF ΔY $\Delta Y = \Delta Y_o - \Delta Y_1$
$\Delta X = \Delta X_o - \Delta X_1 - \Delta X' = 0$

ΔX1: GAP AFTER ΔY BECOMES ECCENTRIC $\sin\theta = \dfrac{\Delta Y}{R}$ $\Delta X' = R - R\cos\theta$
$= R\left\{1 - \cos\left(\sin^{-1}\dfrac{\Delta Y}{R}\right)\right\}$

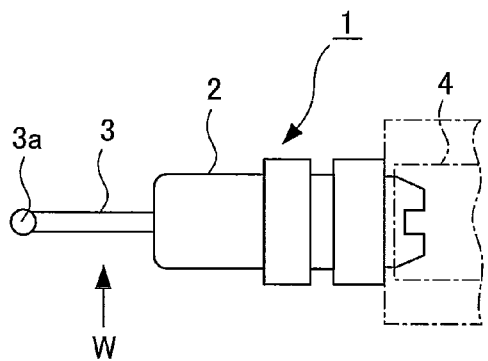
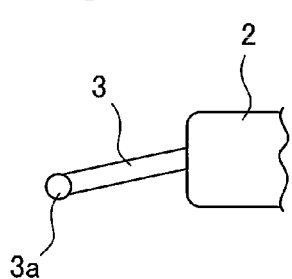
Fig.21(a)  Fig.21(b)
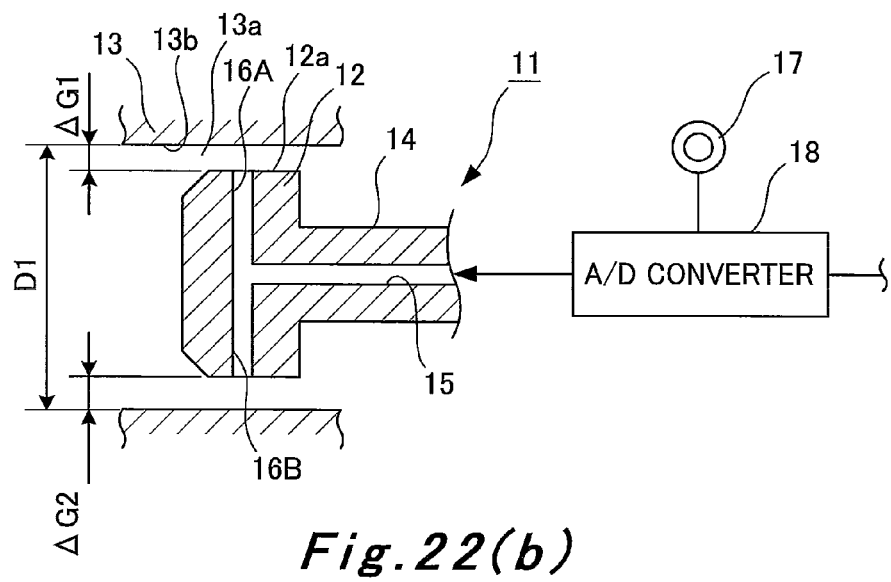
Fig.22(a)
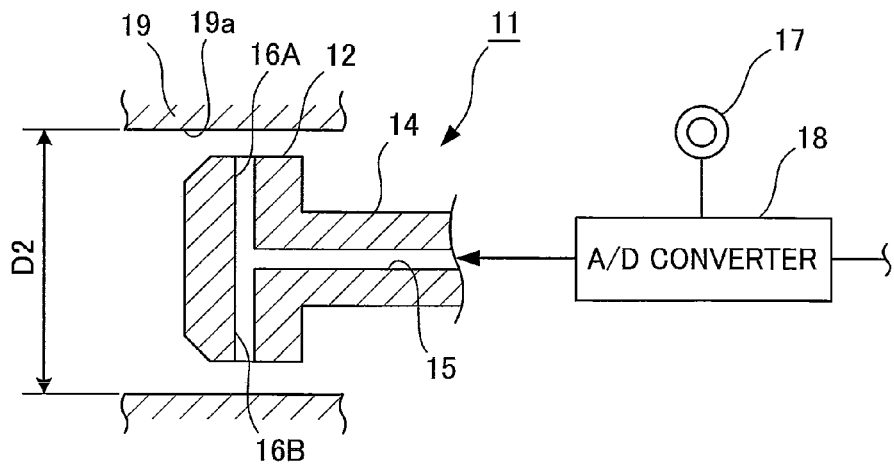
Fig.22(b)

MEASURING HEAD FOR AIR MICROMETER

BACKGROUND OF THE INVENTION

1. Field of the Invention

The present invention relates to a measuring head for an air micrometer.

2. Background Art

Consider a case where, for example, a long drilling tool is attached to a main spindle of a machine tool, and a hole, such as a crank hole or a spool hole, which requires a strict coaxiality, is formed in a workpiece, such as a cylinder block or a valve body of an engine, by use of the drilling tool. In such a case, a bush is used for suppressing the vibration of the drilling tool. In the case of using a bush, the drilling tool is inserted into a bush hole with the axis of the main spindle (namely, the axis of the drilling tool) caused to coincide with the axis of the bush hole (see Part (a) of FIG. 1, the detail of which will be described later).

However, misalignment (eccentricity) sometimes occurs between the axis of the main spindle and the axis of the bush hole because of thermal deformation of the machine tool, and the like. If the drilling process is continued under such eccentric condition, the inner peripheral surface of the bush hole is unevenly worn. As a result, the bush fails to function properly, leading to degradation in the coaxiality of the machined hole.

Accordingly, the uneven wear of the bush hole needs to be prevented in the following manner. The amount of eccentricity between the main spindle and the bush hole is measured on a regular basis, and the position of the ma in spindle is controlled in accordance with the amount of eccentricity (that is, the relative position between the main spindle and the bush hole is corrected). Thereby, the axis of the main spindle (the drilling tool) and the axis of the bush hole are caused to coincide with each other.

In order to achieve this, a touch sensor has conventionally been used to measure the amount of eccentricity between a main spindle and a bush hole. Part (a) of FIG. 21 is a side view of a touch sensor, and Part (b) of FIG. 21 is a view in the direction of the arrow W in Part (a) of FIG. 21. As shown in these figures, a touch sensor 1 includes a measuring head 2 and a stylus 3 protruding on the tip of the measuring head 2. The measuring head 2 is attached to a main spindle 4 of a machine tool in place of a drilling tool. Thereafter, the main spindle 4 is operated to bring a stylus ball 3a on the tip of the stylus 3 into contact with the inner peripheral surface of a bush hole (illustration of which is omitted), whereby the amount of eccentricity between the main spindle 4 and the bush hole is measured.

However, the conventional touch sensor has the following problems because it is a contact sensor, and so on.
(1) A measurement error is likely to occur because of the biting of foreign matter, such as a chip, attached to the inner peripheral surface of a bush hole.
(2) Since the stylus 3 is easily broken, the main spindle needs to be operated at a low speed in order to prevent the breakage of the stylus 3, so that the measurement takes a long time.
(3) Every time the measuring head 2 is replaced because of the failure of the stylus 3, or the like, it is necessary to perform calibration using a dial gauge, which increases the time taken for the measurement.

On the other hand, an air micrometer has been known as a non-contact sensor, which enables measurement in a short time and at high accuracy. Part (a) of FIG. 22 is a view showing the outline of a conventional air micrometer, and Part (b) of FIG. 22 is a view showing the outline of a calibration device for the air micrometer.

As shown in Part (a) of FIG. 22, a measuring head 11 of the conventional air micrometer includes a measuring-head body portion 14 and a measuring-head tip portion 12 formed on the distal end of the measuring-head body portion 14. In the measuring-head tip portion 12, a first measurement air nozzle 16A and a second measurement air nozzle 16B are formed to extend respectively in the opposite directions to each other along the radial direction of the measuring-head tip portion 12. In the measuring-head body portion 14, a measurement air supply passage 15 communicating with the first measurement air nozzle 16A and the second measurement air nozzle 16B is formed.

In the measurement, after the measuring head 11 (the measuring-head tip portion 12) is inserted into a hole 13a of a measurement target 13 as illustrated, measurement air is supplied from a measurement air supply source 17, through an A/D converter 18, to the measurement air supply passage 15 in the measuring-head body portion 14. After passing through the measurement air supply passage 15, the measurement air is divided into two flows, which are thus jetted from the first measurement air nozzle 16A and the second measurement air nozzle 16B, respectively. In this event, the A/D converter 18 detects the pressure of the measurement air (which corresponds to the flow rate of the measurement air), converts the detection signal into a digital signal, and outputs the digital signal to a control device (illustration of which is omitted). The control device obtains the flow rate of the measurement air from the pressure detection signal outputted from the A/D converter 18, and obtains the diameter D1 of the measurement target hole 13a on the basis of data on the flow rate of the measurement air and pre-stored data representing the relationship between the hole diameter and the flow rate of the measurement air.

In addition, the data representing the relationship between the measurement flow rate and the hole diameter is obtained in advance by use of an air-micrometer calibration device (a master gauge) 19 as shown in Part (b) of FIG. 22. Specifically, after the measuring head 11 (the measuring-head tip portion 12) is inserted into a master hole 19a, having a predetermined diameter D2, of the air-micrometer calibration device 19 as illustrated, the measurement air is supplied from the air supply source 17, through the A/D converter 18, to the air supply passage 15 in the measurement-head main body 14. After passing through the measurement air supply passage 15, the measurement air is divided into two flows, which are thus jetted from the first measurement air nozzle 16A and the second measurement air nozzle 16B, respectively. The A/D converter detects the pressure of the measurement air (which corresponds to the flow rate of the measurement air) in this event, converts the detection signal into a digital signal, and outputs the digital signal to the control device (not illustrated). The control device obtains the flow rate of the measurement air from the pressure detection signal outputted from the A/D converter 18. This measurement is performed on two types of master holes having different diameters D2, that is, large and small master holes 19a. Then, the control device stores data on the flow rate of measurement air and data on the diameter D2 inputted in advance as the aforementioned data representing the relationship between the flow rate of the measurement air and the hole diameter.

Patent Document 1: Japanese Patent Application Publication No. 2006-284376
Patent Document 2: Japanese Patent Application Publication No. Sho 58-114835
Patent Document 3: Japanese Patent Application Publication No. Hei 6-186009

Patent Document 4: Japanese Patent Application Publication No. Hei 7-134018

BRIEF SUMMARY OF THE INVENTION

Problems to be Solved by the Invention

However, the above-described conventional measuring head 11 for the air micrometer is only capable of detecting the hole diameter D1, but incapable of detecting gaps ΔG1 and ΔG2 each between the outer peripheral surface 12a of the measuring head 12 and the inner peripheral surface 13b of the measurement target hole 13a as shown in Part (a) of FIG. 22. For this reason, even when the measuring head 11 is employed as it is for the measurement of a bush hole, only the inner diameter of the bush hole can be measured, but the gaps between the outer peripheral surface 12a of the measuring-head tip portion 12 and the inner peripheral surface of the bush hole cannot be measured. In short, the amount of eccentricity between the main spindle and the bush hole cannot be measured.

In view of the above-described circumstances, an object of the present invention is to provide a measuring head for an air micrometer which is capable of measuring the amount of eccentricity between a main spindle and a bush hole.

Means for Solving the Problems

A measuring head for an air micrometer of a first invention for solving the above-described problems is a measuring head for an air micrometer, the measuring head configured to be mounted on a main spindle of a machine tool at the time of measurement and inserted into a bush hole of a bush attached to a work table of the machine tool, for measuring an amount of eccentricity between the bush hole and the main spindle, the measuring head characterized by comprising:
a measuring-head body portion; and
a measuring-head tip portion provided on a distal end of the measuring-head body portion, and configured to be inserted into the bush hole at the time of the measurement,
the measuring head characterized in that
one or a plurality of measurement air nozzles are formed in the measuring-head tip portion, the measurement air nozzles configured to blow measurement air to a gap between an outer peripheral surface of the measuring-head tip portion and an inner peripheral surface of the bush hole respectively through jetting openings in the outer peripheral surface at the time of measurement,
individual measurement air supply passages corresponding to the respective measurement air nozzles are formed in the measurement-head body portion, and
the measurement air is supplied to the measurement air nozzles respectively through the individual measurement air supply passages.

In addition, a measuring head for an air micrometer of a second invention, according to the measuring head for an air micrometer of the first invention, is characterized in that the measurement air nozzles are a first measurement air nozzle and a second measurement air nozzle each of which is formed to extend in a radial direction of the measuring-head tip portion, and which have an angle of 180 degrees with respect to each other in a circumferential direction of the measuring-head tip portion, and the measurement air supply passages are a first measurement air supply passage for supplying the measurement air to the first measurement air nozzle and a second measurement air supply passage for supplying the measurement air to the second measurement air nozzle.

Additionally, a measuring head for an air micrometer of a third invention, according to the measuring head for an air micrometer of the first invention, is characterized in that the measurement air nozzles are a first measurement air nozzle, a second measurement air nozzle, a third measurement air nozzle, and a fourth measurement air nozzle each of which is formed to extend in a radial direction of the measuring-head tip portion, and each of which has an angle of 90 degrees with respect to its adjacent ones in a circumferential direction of the measuring-head tip portion, and the measurement air supply passages are a first measurement air supply passage for supplying the measurement air to the first measurement air nozzle, a second measurement air supply passage for supplying the measurement air to the second measurement air nozzle, a third measurement air supply passage for supplying the measurement air to the third measurement air nozzle and a fourth measurement air supply passage for supplying the measurement air to the fourth measurement air nozzle.

Moreover, a measuring head for an air micrometer of a fourth invention, according to the measuring head for an air micrometer of the first invention, is characterized in that the measurement air nozzles are a first measurement air nozzle and a second measurement air nozzle each of which is formed to extend in a radial direction of the measuring-head tip portion, and which have an angle of 90 degrees with respect to each other in a circumferential direction of the measuring-head tip portion, and the measurement air supply passages are a first measurement air supply passage for supplying the measurement air to the first measurement air nozzle and a second measurement air supply passage for supplying the measurement air to the second measurement air nozzle.

Further, a measuring head for an air micrometer of a fifth invention, according to the measuring head for an air micrometer of the first invention, is characterized in that the measurement air nozzles are a single measurement air nozzle formed to extend in a radial direction of the measuring-head tip portion, and the measurement air supply passages are a single measurement air supply passage for supplying the measurement air to the single measurement air nozzle.

Furthermore, a measuring head for an air micrometer of a sixth invention, according to the measuring head for an air micrometer of the second invention, is characterized in that the measurement air is supplied from a first measurement air supply passage and a second measurement air supply passage that are formed in a support portion of the main spindle, through a first measurement air supply passage and a second measurement air supply passage in a rotary joint mounted on the measuring-head body portion, to the first measurement air supply passage and the second measurement air supply passage in the measuring-head body portion, respectively, or the measurement air is supplied from a first measurement air supply passage and a second measurement air supply passage that are formed in a support portion of the main spindle, through a first measurement air supply passage and a second measurement air supply passage in a rotary joint mounted on the main spindle as well as a first measurement air supply passage and a second measurement air supply passage that are formed in the main spindle, to the first measurement air supply passage and the second measurement air supply passage in the measuring-head body portion, respectively.

Also, a measuring head for an air micrometer of a seventh invention, according to the measuring head for an air micrometer of the fifth invention, is characterized in that the measurement air is supplied from a measurement air supply passage that is formed in a support portion of the main spindle, through a measurement air supply passage in a rotary joint mounted on the measuring-head body portion, to the measurement air supply passage in the measuring head body portion, or the measurement air is supplied from a measurement air supply passage that is formed in a support portion of the main spindle, through a measurement air supply passage in a rotary joint mounted on the main spindle as well as a measurement air supply passage that is formed in the main spindle, to the measurement air supply passage in the measuring head body portion.

In addition, a measuring head for an air micrometer of an eighth invention, according to the measuring head for an air micrometer of the third invention, is characterized in that the measurement air is supplied from a first measurement air supply passage, a second measurement air supply passage, a third measurement air supply passage, and a fourth measurement air supply passage that are formed in a support portion of the main spindle, to the first measurement air supply passage, the second measurement air supply passage, the third measurement air supply passage, and the fourth measurement air supply passage in the measuring-head body portion, respectively.

Additionally, a measuring head for an air micrometer of a ninth invention, according to the measuring head for an air micrometer of the third invention, is characterized in that the measurement air is supplied from a first measurement air supply passage and a second measurement air supply passage that are formed in a support portion of the main spindle, to the first measurement air supply passage and the second measurement air supply passage in the measuring-head body portion, respectively.

Moreover, a measuring head for an air micrometer of a tenth invention, according to any one of the measuring heads for an air micrometer of the first to ninth inventions, is characterized in that an air-blow nozzle is formed in the measuring-head tip portion, the air-blow nozzle configured to jet air-blow air toward the inner peripheral surface of the bush hole forward through a jetting opening in a tapered surface on a peripheral edge of a distal end of the measuring-head tip portion, at the time of measurement and an air-blow air supply passage for supplying the air-blow air to the air-blow nozzle is formed in the measuring-head body portion.

Further, a measuring head for an air micrometer of an eleventh invention, according to the measuring head for an air micrometer of the tenth invention, is characterized in that the air-blow air is supplied from an air-blow air supply passage that is formed in a support portion of the main spindle, to the air-blow air supply passage in the measuring-head body portion, directly or through an air-blow air supply passage in a rotary joint mounted on the main spindle as well as an air-blow air supply passage that is formed in the main spindle.

Furthermore, a measuring head for an air micrometer of a twelfth invention, according to any one of the measuring heads for an air micrometer of the first to eleventh inventions, is characterized in that the measuring-head body portion includes:

a distal-end-side member to which the measuring-head tip portion is fixed;

a proximal-end-side member;

an elastic member interposed between the distal-end-side member and the proximal-end-side member; and a flexible hose connecting a measurement air supply passage that is formed in the distal-end-side member and a measurement air supply passage that is formed in the proximal-end-side member to each other.

Effects of the Invention

According to the measuring head for an air micrometer of the first invention, provided is a measuring head for an air micrometer, the measuring head configured to be mounted on a main spindle of a machine tool at the time of measurement and inserted into a bush hole of a bush attached to a work table of the machine tool, for measuring an amount of eccentricity between the bush hole and the main spindle, the measuring head characterized by comprising: a measuring-head body portion; and a measuring-head tip portion provided on a distal end of the measuring-head body portion, and configured to be inserted into the bush hole at the time of the measurement, the measuring head characterized in that one or a plurality of measurement air nozzles are formed in the measuring-head tip portion, the measurement air nozzles configured to blow measurement air to a gap between an outer peripheral surface of the measuring-head tip portion and an inner peripheral surface of the bush hole respectively through jetting openings in the outer peripheral surface at the time of measurement, individual measurement air supply passages corresponding to the respective measurement air nozzles are formed in the measurement-head body portion, and the measurement air is supplied to the measurement air nozzles respectively through the individual measurement air supply passages. With this configuration, the measuring head is capable of measuring, not the inner diameter of the bush hole, but the gap between the outer peripheral surface of the measuring-head tip portion and the inner peripheral surface of the bush hole. Then, the amount of eccentricity between the main spindle and the bush hole is obtained on the basis of the measured value of the gap, and the position of the main spindle is controlled in accordance with the amount of eccentricity (that is, the relative position of the main spindle and the bush hole is corrected), whereby the axis of the main spindle (the drilling tool) and the axis of the bush hole are caused to coincide with each other. Therefore, uneven wear of the bush hole can be prevented.

According to the measuring head for an air micrometer of the second invention, provided is the measuring head for an air micrometer of the first invention, characterized in that the measurement air nozzles are a first measurement air nozzle and a second measurement air nozzle each of which is formed to extend in a radial direction of the measuring-head tip portion, and which have an angle of 180 degrees with respect to each other in a circumferential direction of the measuring-head tip portion, and the measurement air supply passages are a first measurement air supply passage for supplying the measurement air to the first measurement air nozzle and a second measurement air supply passage for supplying the measurement air to the second measurement air nozzle. With this configuration, the measuring head is capable of measuring, not the inner diameter of the bush hole, but the gaps between the outer peripheral surface of the measuring-head tip portion and the inner peripheral surface of the bush hole at both sides in the first radial direction and at both sides in the second radial direction to each of which the measuring-head tip portion is perpendicular, by rotating the measuring head by 90 degrees by means of the main spindle. Accordingly, the amounts of eccentricity between the main spindle and the bush hole are obtained on the basis of the measured values of the gaps (for example, by calculation of equations (1) and (2) described later), and then, the position of the main spindle is controlled in accordance with the amounts of eccentricity (that is, the relative position between the main spindle and the bush hole is corrected), whereby the axis of the main spindle (the drilling tool) and the axis of the bush hole are caused to coincide with each other. Therefore, uneven wear of the bush hole can be prevented.

According to the measuring head for an air micrometer of the third invention, provided is the measuring head for an air micrometer of the first invention, characterized in that the measurement air nozzles are a first measurement air nozzle, a second measurement air nozzle, a third measurement air nozzle, and a fourth measurement air nozzle each of which is formed to extend in a radial direction of the measuring-head tip portion, and each of which has an angle of 90 degrees with respect to its adjacent ones in a circumferential direction of the measuring-head tip portion, and the measurement air supply passages are a first measurement air supply passage for supplying the measurement air to the first measurement air nozzle, a second measurement air supply passage for supplying the measurement air to the second measurement air nozzle, a third measurement air supply passage for supplying the measurement air to the third measurement air nozzle and a fourth measurement air supply passage for supplying the measurement air to the fourth measurement air nozzle. With this configuration, the measuring head is capable of measuring, not the inner diameter of the bush hole, but the gaps between the outer peripheral surface of the measuring-head tip portion and the inner peripheral surface of the bush hole at both sides in the first radial direction and at both sides in the second radial direction to each of which the measuring-head tip portion is perpendicular. Accordingly, the amounts of eccentricity between the main spindle and the bush hole are obtained on the basis of the measured values of the gaps (for example, by calculation of equations (1) and (2) described later), and then, the position of the main spindle is controlled in accordance with the amounts of eccentricity (that is, the relative position between the main spindle and the bush hole is corrected), whereby the axis of the main spindle (the drilling tool) and the axis of the bush hole are caused to coincide with each other. Therefore, uneven wear of the bush hole can be prevented.

According to the measuring head for an air micrometer of the fourth invention, provided is the measuring head for an air micrometer of the first invention, characterized in that the measurement air nozzles are a first measurement air nozzle and a second measurement air nozzle each of which is formed to extend in a radial direction of the measuring-head tip portion, and which have an angle of 90 degrees with respect to each other in a circumferential direction of the measuring-head tip portion, and the measurement air supply passages are a first measurement air supply passage for supplying the measurement air to the first measurement air nozzle and a second measurement air supply passage for supplying the measurement air to the second measurement air nozzle. With this configuration, the measuring head is capable of measuring, not the inner diameter of the bush hole, but the gaps between the outer peripheral surface of the measuring-head tip portion and the inner peripheral surface of the bush hole in the first radial direction and the second radial direction to each of which directions the measuring-head tip portion is perpendicular. Accordingly, the amounts of eccentricity between the main spindle and the bush hole are obtained on the basis of the measured values of the gaps (for example, by subtracting the measured values of the gaps from values of gaps between the outer peripheral surface of the measuring-head tip portion and the inner peripheral surface of the bush hole at the time when there is no eccentricity), and then, the position of the main spindle is controlled in accordance with the amounts of eccentricity (that is, the relative position between the main spindle and the bush hole is corrected), whereby the axis of the main spindle (the drilling tool) and the axis of the bush hole are caused to coincide with each other. Therefore, uneven wear of the bush hole can be prevented.

According to the measuring head for an air micrometer of the fifth invention, provided is the measuring head for an air micrometer of the first invention, characterized in that the measurement air nozzles are a single measurement air nozzle formed to extend in a radial direction of the measuring-head tip portion, and the measurement air supply passages are a single measurement air supply passage for supplying the measurement air to the single measurement air nozzle. With this configuration, the measuring head is capable of measuring, not the inner diameter of the bush hole, but the gaps between the outer peripheral surface of the measuring-head tip portion and the inner peripheral surface of the bush hole in the first radial direction and the second radial direction to each of which directions the measuring-head tip portion is perpendicular, by rotating the measuring head by 90 degrees by means of the main spindle, for example. Accordingly, the amounts of eccentricity between the main spindle and the bush hole are obtained on the basis of the measured values of the gaps (for example, by subtracting the measured values of the gaps from values of gaps between the outer peripheral surface of the measuring-head tip portion and the inner peripheral surface of the bush hole at the time when there is no eccentricity), and then, the position of the main spindle is controlled in accordance with the amounts of eccentricity (that is, the relative position between the main spindle and the bush hole is corrected), whereby the axis of the main spindle (the drilling tool) and the axis of the bush hole are caused to coincide with each other. Therefore, uneven wear of the bush hole can be prevented.

According to the measuring head for an air micrometer of the sixth invention, provided is the measuring head for an air micrometer of the second invention, characterized in that the measurement air is supplied from a first measurement air supply passage and a second measurement air supply passage that are formed in a support portion of the main spindle, through a first measurement air supply passage and a second measurement air supply passage in a rotary joint mounted on the measuring-head body portion, to the first measurement air supply passage and the second measurement air supply passage in the measuring-head body portion, respectively, or the measurement air is supplied from a first measurement air supply passage and a second measurement air supply passage that are formed in a support portion of the main spindle, through a first measurement air supply passage and a second measurement air supply passage in a rotary joint mounted on the main spindle as well as a first measurement air supply passage and a second measurement air supply passage that are formed in the main spindle, to the first measurement air supply passage and the second measurement air supply passage in the measuring-head body portion, respectively. With this configuration, the following effect and the like can be obtained. The measurement air can be supplied from the support portion of the main spindle, and there is no need to connect such supply means as a hose for supplying measurement air, directly to the measuring head. Therefore, operations for measurement, such as attachment and detachment of the measuring head to and from the main spindle, are facilitated.

According to the measuring head for an air micrometer of the seventh invention, provided is the measuring head for an air micrometer of the fifth invention, characterized in that the measurement air is supplied from a measurement air supply passage that is formed in a support portion of the main spindle, through a measurement air supply passage in a rotary joint mounted on the measuring-head body portion, to the measurement air supply passage in the measuring head body portion, or the measurement air is supplied from a measurement air supply passage that is formed in a support portion of the main spindle, through a measurement air supply passage in a rotary joint mounted on the main spindle as well as a measurement air supply passage that is formed in the main spindle, to the measurement air supply passage in the measuring head body portion. With this configuration, the following effect and the like can be obtained. The measurement air can be supplied from the support portion of the main spindle, and there is no need to connect such supply means as a hose for supplying measurement air, directly to the measuring head. Therefore, operations for measurement, such as attachment and detachment of the measuring head to and from the main spindle, are facilitated.

According to the measuring head for an air micrometer of the eighth invention, provided is the measuring head for an air micrometer of the third invention, characterized in that the measurement air is supplied from a first measurement air supply passage, a second measurement air supply passage, a third measurement air supply passage, and a fourth measurement air supply passage that are formed in a support portion of the main spindle, to the first measurement air supply passage, the second measurement air supply passage, the third measurement air supply passage, and the fourth measurement air supply passage in the measuring-head body portion, respectively. With this configuration, the following effect and the like can be obtained. The measurement air can be supplied from the support portion of the main spindle, and there is no need to connect such supply means as a hose for supplying measurement air, directly to the measuring head. Therefore, operations for measurement, such as attachment and detachment of the measuring head to and from the main spindle, are facilitated.

According to the measuring head for an air micrometer of the ninth invention, provided is the measuring head for an air micrometer of the fourth invention, characterized in that the measurement air is supplied from a first measurement air supply passage and a second measurement air supply passage that are formed in a support portion of the main spindle, to the first measurement air supply passage and the second measurement air supply passage in the measuring-head body portion, respectively. With this configuration, the following effect and the like can be obtained. The measurement air can be supplied from the support portion of the main spindle, and there is no need to connect such supply means as a hose for supplying measurement air, directly to the measuring head. Therefore, operations for measurement, such as attachment and detachment of the measuring head to and from the main spindle, are facilitated.

According to the measuring head for an air micrometer of the tenth invention, provided is any one of the measuring heads for an air micrometer of the first to ninth inventions, characterized in that an air-blow nozzle is formed in the measuring-head tip portion, the air-blow nozzle configured to jet air-blow air toward the inner peripheral surface of the bush hole forward through a jetting opening in a tapered surface on a peripheral edge of a distal end of the measuring-head tip portion, at the time of measurement and an air-blow air supply passage for supplying the air-blow air to the air-blow nozzle is formed in the measuring-head body portion. With this configuration, even if foreign matter, such as a chip, is attached onto the inner peripheral surface of the bush hole, it is possible to perform the gap measurement after removing the foreign matter from the inner peripheral surface of the bush hole with the air blow, so that highly-precise gap measurement can be performed.

According to the measuring head for an air micrometer of the eleventh invention, provided is the measuring head for an air micrometer of the tenth invention, characterized in that the air-blow air is supplied from an air-blow air supply passage that is formed in a support portion of the main spindle, to the air-blow air supply passage in the measuring-head body portion, directly or through an air-blow air supply passage in a rotary joint mounted on the main spindle as well as an air-blow air supply passage that is formed in the main spindle. With this configuration, the following effect and the like can be obtained. The air-blow air can be supplied from the support portion of the main spindle, and there is no need to connect such supply means as a hose for supplying air-blow air, directly to the measuring head. Therefore, operations for measurement, such as attachment and detachment of the measuring head to and from the main spindle, are facilitated.

According to the measuring head for an air micrometer of the twelfth invention, provided is any one of the measuring heads for an air micrometer of the first to eleventh inventions, characterized in that the measuring-head body portion includes: a distal-end-side member to which the measuring-head tip portion is fixed; a proximal-end-side member; an elastic member interposed between the distal-end-side member and the proximal-end-side member; and a flexible hose connecting a measurement air supply passage that is formed in the distal-end-side member and a measurement air supply passage that is formed in the proximal-end-side member to each other. With this configuration, even if the measuring-head tip portion comes into contact with the bush during the insertion of the measuring-head tip portion into the bush hole, the elastic member is expanded or compressed to cause the measuring-head tip portion to move toward the proximal end, so that the impact at the time of the contact is mitigated.

BRIEF DESCRIPTION OF THE DRAWINGS

FIG. 2 is a partially cut-away side view showing the measuring head.

[FIG. 3] Part (a) of FIG. 3 is a cross-sectional view showing a part of the measuring head, Part (b) of FIG. 3 is a view in the direction of the arrow A in FIG. 2, Part (c) of FIG. 3 is a cross-sectional view taken along the line B-B in FIG. 2 and viewed in the direction of the arrows B, and Part (d) of FIG. 3 is a cross-sectional view taken along the line C-C in FIG. 2 and viewed in the direction of the arrows C.

FIG. 4 is a system configurational diagram of the air micrometer.

FIG. 6 is a graph for explaining data representing the relationship between the flow rate of a measurement air and a gap.

FIG. 9 is a side view of a measuring head for an air micrometer according to Embodiment 2 of the present invention.

[FIG. 11] FIG. 11 is a system configurational diagram of the air micrometer.

FIG. 12 is a view in the direction of the arrow M in FIG. 11.

FIG. 13 is a view showing how the measuring head is calibrated using an air-micrometer calibration device (similar to Part (b) of FIG. 8).

[FIG. 14] Part (a) of FIG. 14 is a side view of a main part of a measuring head for an air micrometer according to Embodiment 3 of the present invention, Part (b) of FIG. 14 is a view in the direction of the arrow N in Part (a) of FIG. 14, Part (c) of FIG. 14 is a cross-sectional view taken along the line O-O in Part (a) of FIG. 14 and viewed in the direction of the arrows O, Part (d) of FIG. 14 is a cross-sectional view taken along the line P-P in Part (a) of FIG. 14 and viewed in the direction of the arrows P, and Part (e) of FIG. 14 is a cross-sectional view taken along the line Q-Q in Part (a) of FIG. 14 and viewed in the direction of the arrows Q.

FIG. 15 is a view showing how gap measurement is performed by the measuring head (similar to FIG. 5).

FIG. 16 is a view showing how the measuring head is calibrated using an air-micrometer calibration device (similar to Part (b) of FIG. 8).

FIG. 17 shows a method of calculating an amount of eccentricity. Part (a) of FIG. 17 is a view showing a state where a measuring-head tip portion and a bush hole are not eccentric from each other, Part (b) of FIG. 17 is a view showing a state where the measuring-head tip portion is eccentric from the bush hole only in the X-axis direction, and Part (c) of FIG. 17 is a main-part enlarged view of the state shown in Part (b) of FIG. 17.

FIG. 20 is a view showing how the measuring head is calibrated using the air-micrometer calibration device (similar to Part (b) of FIG. 8).

[FIG. 21] Part (a) of FIG. 21 is a side view of a touch sensor, and Part (b) of FIG. 21 is a view in the direction of the arrow W in Part (a) of FIG. 21.

[FIG. 22] Part (a) of FIG. 22 is a view showing the outline of a conventional air micrometer, and Part (b) of FIG. 22 is a view showing the outline of a calibration device for the air micrometer.

EXPLANATION OF REFERENCE NUMERALS

21 MACHINE TOOL; 22 BED; 23 WORK TABLE; 24 COLUMN; 25 MAIN-SPINDLE HEAD; 26 MAIN SPINDLE; 27 BUSH ATTACHMENT JIG; 27a HORIZONTAL PORTION; 27b VERTICAL PORTION; 28, 29, 30 RAIL; 31 BUSH; 31a BUSH HOLE; 31b INNER PERIPHERAL SURFACE; 32 DRILLING TOOL; 41 MEASURING HEAD; 42 MEASURING-HEAD BODY PORTION; 43 MEASURING-HEAD TIP PORTION; 43a OUTER PERIPHERAL SURFACE; 45 CONNECTION PORTION; 46 CASE; 46a INNER PERIPHERAL SURFACE; 47 SCREW; 48 SPIGOT FITTING PORTION; 49, 50 TAPERED SURFACE; 51A FIRST MEASUREMENT AIR NOZZLE (MEASUREMENT AIR NOZZLE); 51B SECOND MEASUREMENT AIR NOZZLE; 51C THIRD MEASUREMENT AIR NOZZLE; 51D FOURTH MEASUREMENT AIR NOZZLE; 51A-1, 51B-1, 51C-1, 51D-1 JETTING OPENING; 52A, 52B, 52C, 52D AIR-BLOW NOZZLE; 52A-1, 52B-1, 52C-1, 52D-1 JETTING OPENING; 53A FIRST MEASUREMENT AIR SUPPLY PASSAGE, MEASUREMENT AIR SUPPLY PASSAGE; 53B SECOND MEASUREMENT AIR SUPPLY PASSAGE; 53r THIRD MEASUREMENT AIR SUPPLY PASSAGE; 53D FOURTH MEASUREMENT AIR SUPPLY PASSAGE; 54 PROXIMAL-END-SIDE MEMBER; 55A FIRST MEASUREMENT AIR SUPPLY PASSAGE, MEASUREMENT AIR SUPPLY PASSAGE; 55B SECOND MEASUREMENT AIR SUPPLY PASSAGE; 55C THIRD MEASUREMENT AIR SUPPLY PASSAGE; 55D FOURTH MEASUREMENT AIR SUPPLY PASSAGE; 56 AIR-BLOW AIR SUPPLY PASSAGE; 58 LONG HOLE; 59 PROXIMAL END PORTION; 60 SHAFT PORTION; 61 DISTAL END PORTION; 62 PROXIMAL SIDE END WALL; 62A HOLE; 63A FIRST MEASUREMENT AIR SUPPLY PASSAGE; 63B SECOND MEASUREMENT AIR SUPPLY PASSAGE; 63C THIRD MEASUREMENT AIR SUPPLY PASSAGE; 63D FOURTH MEASUREMENT AIR SUPPLY PASSAGE; 64A, 64B, 64C, 64D HOSE; 65 AIR-BLOW AIR SUPPLY PASSAGE;
66 SPACE PORTION; 67 ROTARY JOINT; 68A FIRST MEASUREMENT AIR SUPPLY PASSAGE; 68B SECOND MEASUREMENT AIR SUPPLY PASSAGE; 69A FIRST COUPLER; 69B SECOND COUPLER; 69C THIRD COUPLER; 69D FOURTH COUPLER; 70A FIRST MEASUREMENT AIR SUPPLY PASSAGE; 70B SECOND MEASUREMENT AIR SUPPLY PASSAGE; 71 ROTARY JOINT; 72 AIR-BLOW AIR SUPPLY PASSAGE; 73 AIR-BLOW AIR SUPPLY PASSAGE, 74 COIL SPRING; 75 AIR-BLOW AIR SUPPLY PASSAGE; 76A FIRST MEASUREMENT AIR SUPPLY SOURCE; 76B SECOND MEASUREMENT AIR SUPPLY SOURCE; 76C THIRD MEASUREMENT AIR SUPPLY SOURCE;

76D FOURTH MEASUREMENT AIR SUPPLY SOURCE; 77A FIRST A/D CONVERTER; 77B SECOND A/D CONVERTER; 77C THIRD A/D CONVERTER; 77D FOURTH A/D CONVERTER; 78 NC SYSTEM; 79 AIR-BLOW AIR SUPPLY SOURCE; 80 SEQUENCER; 81 CONTROL DEVICE; 91 AIR-MICROMETER CALIBRATION DEVICE; 92 HOUSING HOLE; 93 CLAMPING SLEEVE; 93a INNER PERIPHERAL SURFACE; 94 MEASURING-HEAD INSERTION HOLE; 95 SMALL-DIAMETER MASTER HOLE; 95a INNER PERIPHERAL SURFACE; 96 LARGE-DIAMETER MASTER HOLE; 96a INNER PERIPHERAL SURFACE; 97 HYDRAULIC PRESSURE CHAMBER; 98 PRESSURE OIL SUPPLY PASSAGE; 99 HOSE

DETAILED DESCRIPTION OF THE INVENTION

Hereinafter, Embodiments of the present invention will be described in detail on the basis of the drawings.

Embodiment 1

Figure 1A:
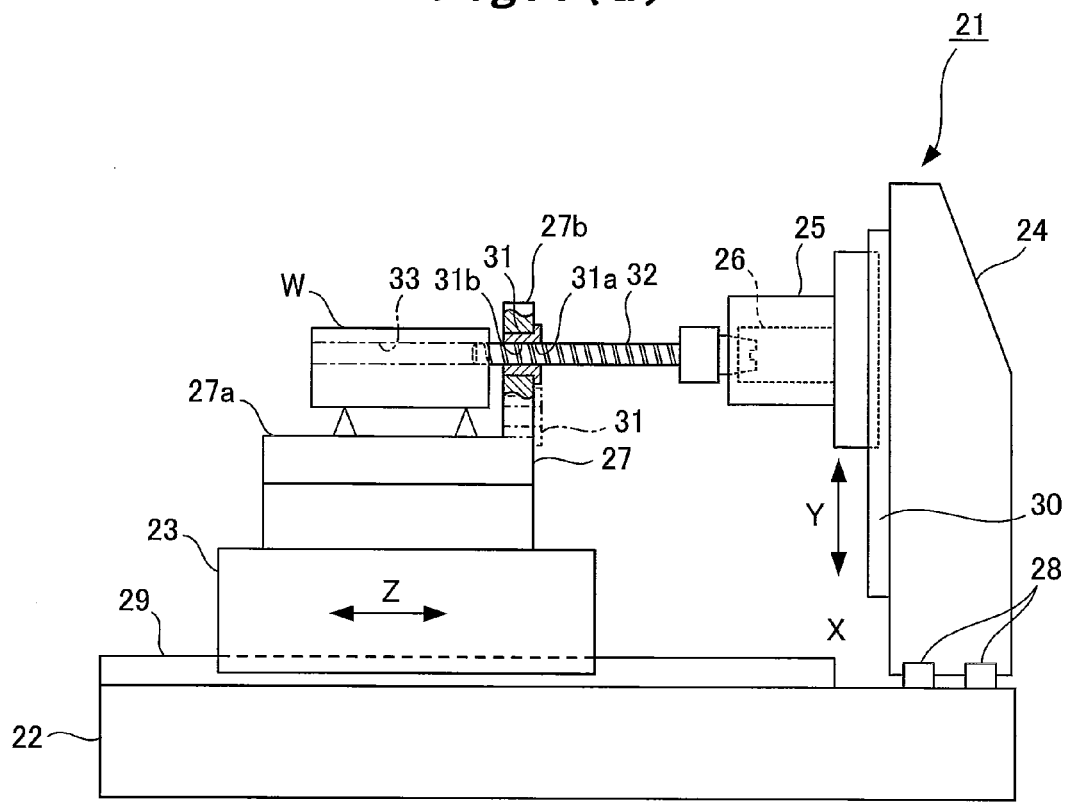
[FIG. 1] Part (a) of FIG. 1 is a view showing an example of a machine tool for which a measuring head for an air micrometer according to Embodiment 1 of the present invention is employed, and Part (b) of FIG. 1 is a main-part enlarged view showing a state where the measuring head is mounted on a main spindle of the machine tool.
Figure 1B:
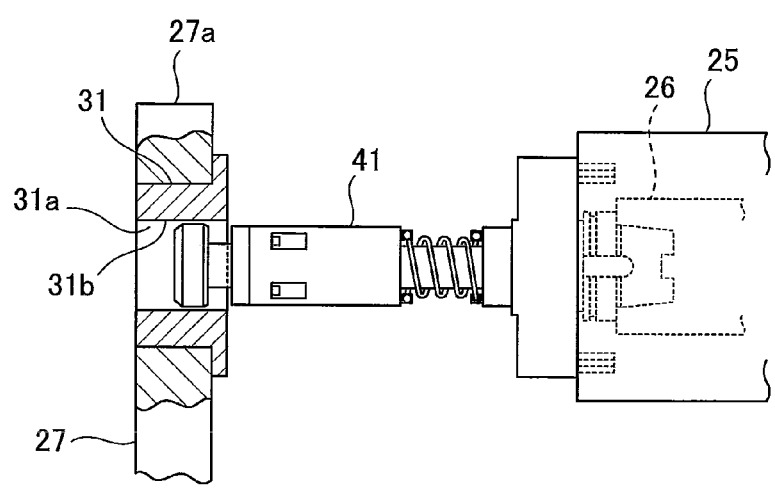
Figure 2:
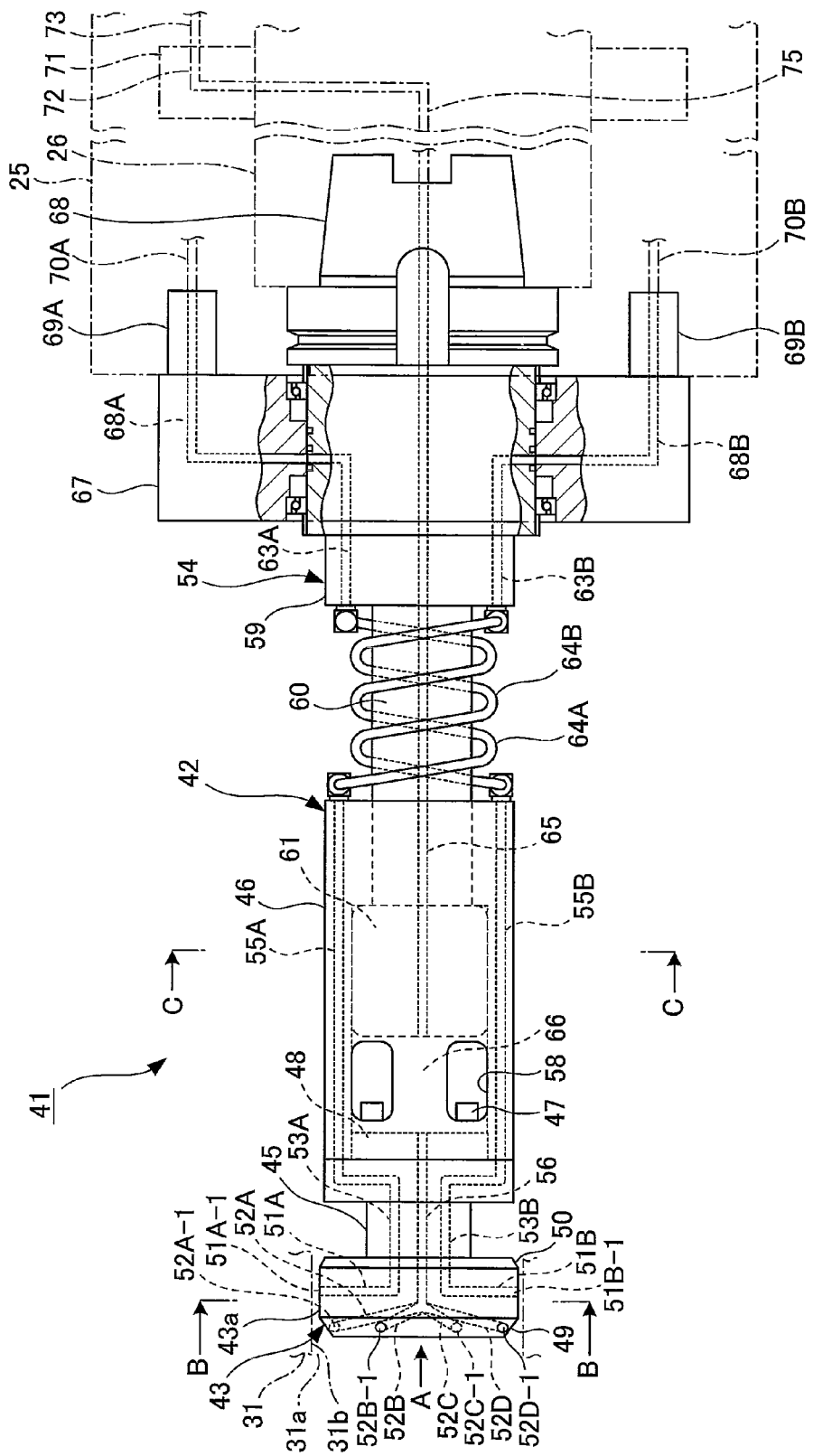
[FIG. 2]
Figure 4:
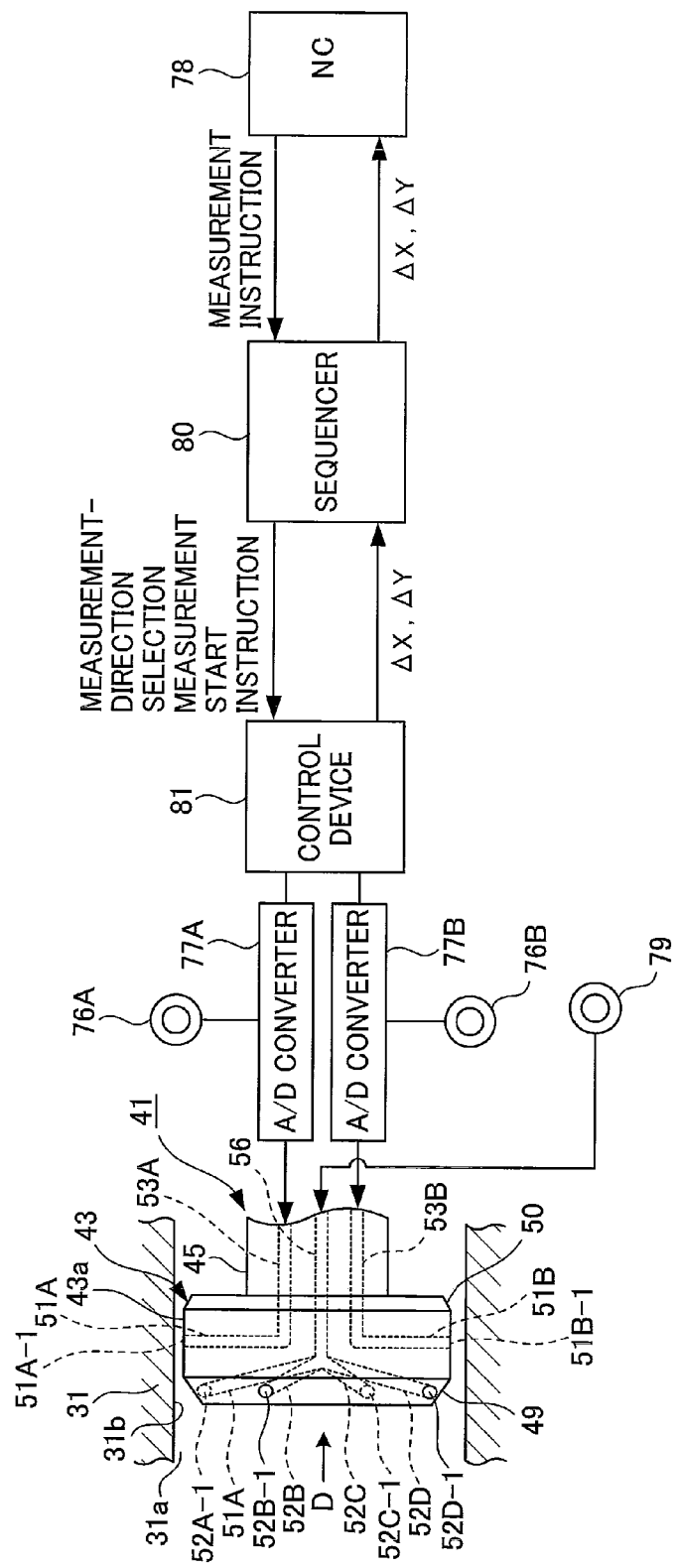
[FIG. 4]
Figure 5A:
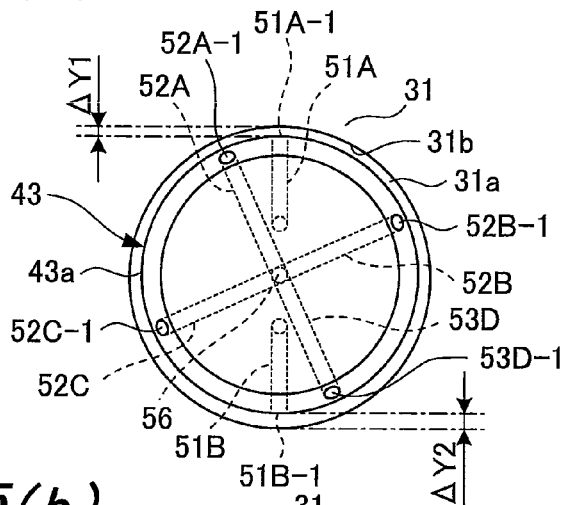
[FIG. 5] Part (a) of FIG. 5 is a view in the direction of the arrow D in FIG. 4, and Part (b) of FIG. 5 is a view showing a state where the measuring head is rotated by 90 degrees from the state shown in Part (a) of FIG. 5.
Figure 5B:
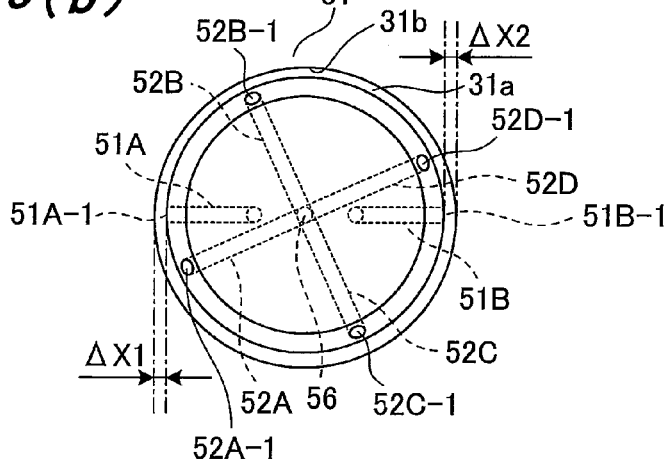
Figure 6:
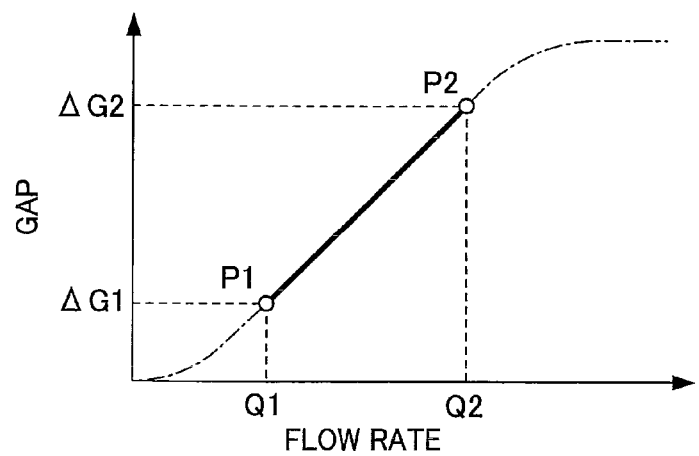
[FIG. 6]

Part (a) of FIG. 1 is a view showing an example of a machine tool for which a measuring head for an air micrometer according to Embodiment 1 of the present invention is employed, and Part (b) of FIG. 1 is a main-part enlarged view showing a state where the measuring head is mounted on a main spindle of the machine tool. FIG. 2 is a partially cutaway side view showing the measuring head. Part (a) of FIG. 3 is a cross-sectional view showing a part of the measuring head, Part (b) of FIG. 3 is a view in the direction of the arrow A in FIG. 2, Part (c) of FIG. 3 is a cross-sectional view taken along the line B-B in FIG. 2 and viewed in the direction of the arrows B, and Part (d) of FIG. 3 is a cross-sectional view taken along the line C-C in FIG. 2 and viewed in the direction of the arrows C. FIG. 4 is a system configurational diagram of the air micrometer. Part (a) of FIG. 5 is a view in the direction of the arrow D in FIG. 4, and Part (b) of FIG. 5 is a view showing a state where the measuring head is rotated by 90 degrees from the state shown in Part (a) of FIG. 5. FIG. 6 is a graph for explaining data representing the relationship between the flow rate of a measurement air and a gap.

Figure 7A:
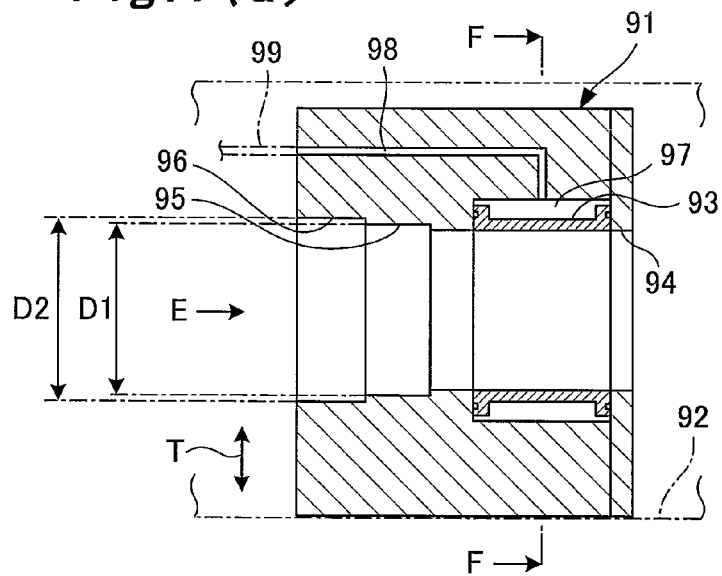
[FIG. 7] Part (a) of FIG. 7 is a cross-sectional view of an air-micrometer calibration device (a master gauge) used for calibration of the measuring head, Part (b) of FIG. 7 is a view in the direction of the arrow E in Part (a) of FIG. 7, and Part (c) of FIG. 7 is a cross-sectional view taken along the line F-F in Part (a) of FIG. 7 and viewed in the direction of the arrows F.
Figure 7B:
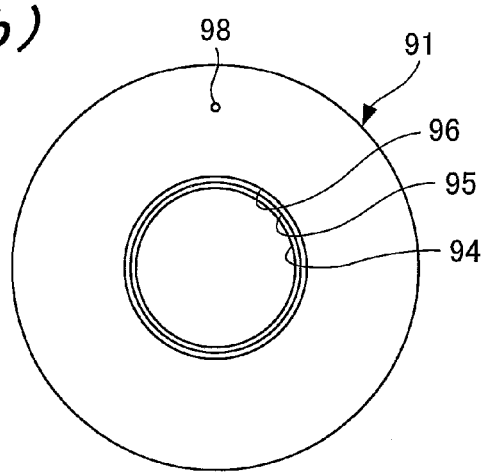
Figure 7C:
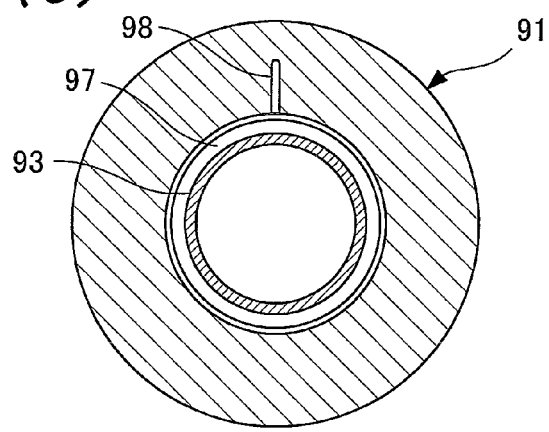
Figure 8A:
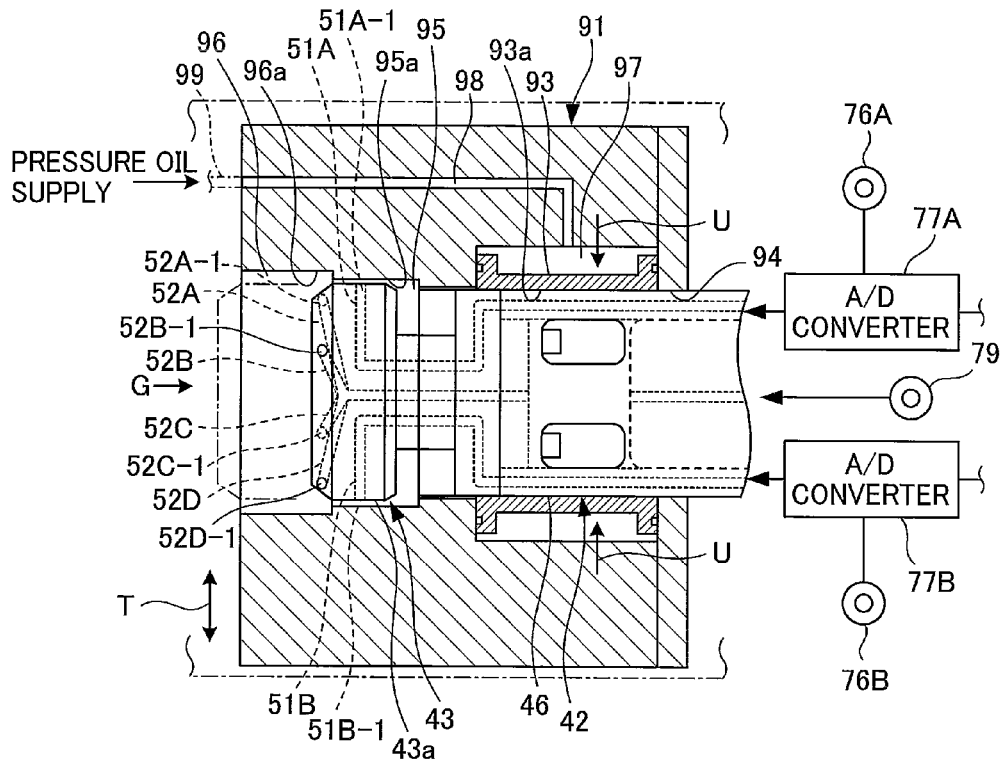
[FIG. 8] Part (a) of FIG. 8 is a view showing how the measuring head is calibrated using the air-micrometer calibration device, and Part (b) of FIG. 8 is a view in the direction of the arrow G in Part (a) of FIG. 8.
Figure 8B:
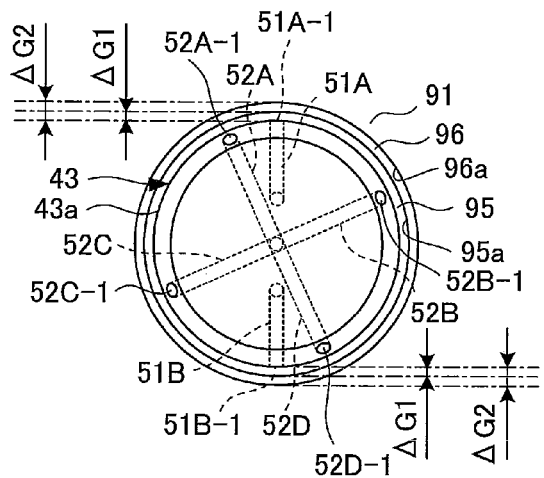

Moreover, Part (a) of FIG. 7 is a cross-sectional view of an air-micrometer calibration device (a master gauge) used for calibration of the measuring head, Part (b) of FIG. 7 is a view in the direction of the arrow E in Part (a) of FIG. 7, and Part (c) of FIG. 7 is a cross-sectional view taken along the line F-F in Part (a) of FIG. 7 and viewed in the direction of the arrows F. Part (a) of FIG. 8 is a view showing how the measuring head is calibrated using the air-micrometer calibration device, and Part (b) of FIG. 8 is a view in the direction of the arrow G in Part (a) of FIG. 8.

A machine tool 21 illustrated in Part (a) of FIG. 1 includes a bed 22, a work table 23 provided on the bed 22, a column 24, a main-spindle head 25, a main spindle 26, a bush attachment jig 27, and the like.

The column 24 is capable of moving along rails 28 provided on an upper surface of the bed 22 in a direction (the X-axis direction) perpendicular to the plane of Part (a) of FIG. 1. The work table 23 is capable of moving along rails 29 provided on the upper surface of the bed 22 in a left-right direction (the Z-axis direction) in Part (a) of FIG. 1. The main-spindle head 25, which is a support portion of the main spindle 26, is capable of moving along rails 30 provided on a front surface of the column 24 in an up-down direction (the Y-axis direction). The illustrated machine tool is a horizontal type. So, the main spindle 26 is provided in the main-spindle head 25 with the axial direction of the main spindle 26 made horizontal, and is rotatably supported by the main-spindle head 25. The column 24, the work table 23, and the main-spindle head 26 are driven by unillustrated drive mechanisms for the respective axes, such as a feed screw mechanism, thereby moving linearly in the X-axis direction, the Z-axis direction, and the Y-axis direction, respectively. The main spindle 26 is rotationally driven by an unillustrated main-spindle motor.

The bush attachment jig 27 has a horizontal portion 27a and a vertical portion 27b, and is fixed onto the work table 23. A workpiece W, such as a cylinder block or a valve body of an engine, is placed on the horizontal portion 27a of the bush attachment jig 27, and is fixed thereto by fixing means such as hydraulic pressure. A bush 31 is attached to the vertical portion of the bush attachment jig 27. The bush 31 is a cylindrical member that has a bush hole 31a having a circular cross section in a center portion of the bush 31. On the other hand, a long drilling tool 32 is mounted on the main spindle 26. The drilling tool 32 is rotationally driven with the main spindle 26 while the drilling tool 32 is inserted through the bush hole 31a so that the vibration thereof is suppressed by the bush 31. In this way, a drilling process is performed to drill a hole 33, such as a crank hole or a spool hole, which requires a strict coaxiality.

Meanwhile, the amount of eccentricity between the main spindle 26 and the bush hole 31a is measured on a regular basis in order to prevent an inner peripheral surface 31b of the bush hole 31a from being unevenly worn because the axis of the main spindle 26 (the drilling tool 32) and the axis of the bush hole 31a are misaligned (because the main spindle 26 and the bush hole 31a are caused to be eccentric) due to thermal deformation of the machine tool 21, or the like.

In this case, a measuring head 41 of the air micrometer is mounted on the main spindle 26 in place of the drilling tool 32 as shown in Part (b) of FIG. 1, and thereafter, is inserted into the bush hole 31a. Thereby, gap measurement (measurement of the amount of eccentricity between the main spindle 26 and the bush hole 31a) is performed (which will be described later in detail). It should be noted that the gap measurement in this case may be performed not only on the bush 31 that is actually used for the drilling process. A bush 31 that is dedicated to the gap measurement may be provided to the bush attachment jig 27 or in a vicinity thereof as indicated by an alternate long and short dash line in Part (a) of FIG. 1, and the gap measurement may be performed on the bush 31 dedicated to the gap measurement.

As shown in FIG. 2 and Part (a) of FIG. 3 to Part (d) of FIG. 3, the measuring head 41 of the air micrometer of Embodiment 1 has a columnar measuring-head body portion 42 and a columnar measuring-head tip portion 43 provided on the distal end of the measuring-head body portion 42. The distal end of the measuring-head body portion 42 is formed into a connection portion 45 (a distal-end-side member) integral with the measuring-head tip portion 43. A spigot fitting portion 48 of the connection portion 45 is fitted into a case 46 of the measuring-head body portion 42. In addition, a plurality of long holes (recessed portions) 58 are formed in an outer peripheral surface of the case 46. The connection portion 45 is screwed to the case 46 with screws 47 inserted from these long holes 58.

A peripheral edge of the distal end of the measuring-head tip portion 43 is formed into a tapered surface 49, while a peripheral edge of the proximal end of the measuring-head tip portion 43 is also formed into a tapered surface 50. The tapered surface 49 is inclined inward in the radial direction of the measuring-head tip portion 43 as extending to the distal end of the measuring-head tip portion 43. The tapered surface 50 is inclined inward in the radial direction of the measuring-head tip portion 43 as extending to the proximal end of the measuring-head tip portion 43.

Moreover, two measurement air nozzles 51A and 51B as well as four air-blow nozzles 52A, 52B, 52C, and 52D are formed in the measuring-head tip portion 43.

The first measurement air nozzle 51A and the second measurement air nozzle 51B are formed to each extend in the radial direction of the measuring-head tip portion 43, and have an angle of 180 degrees with respect to each other in the circumferential direction of the measuring-head tip portion 43. At the time of measurement, the first measurement air nozzle 51A and the second measurement air nozzle 51B jet air toward gaps between an outer peripheral surface 43a of the measuring-head tip portion 43 and the inner peripheral surface 31b of the bush hole 31a through jetting openings 51A-1 and 51B-1 in the outer peripheral surface 43a. Each of the air-blow nozzles 52A, 52B, 52C, and 52D has an angle of 90 degrees with respect to its adjacent ones in the circumferential direction of the measuring-head tip portion 43. The air-blow nozzles 52A, 52B, 52C, and 52D jet air-blow air toward the inner peripheral surface 31b of the bush hole 31a forward through jetting openings 52A-1, 52B-1, 52C-1, and 52D-1 in the tapered surface 49 on the distal end side. Furthermore, a first measurement air supply passage 53A connected to the first measurement air nozzle 51A, a second measurement air supply passage 53B connected to the second measurement air nozzle 51B, and an air-blow air supply passage 56 connected to the air-blow nozzles 52A, 52B, 52C, and 52D are formed in the connection portion 45.

On the other hand, the measuring-head body portion 42 includes the case 46, serving as a distal-end-side member, and a proximal-end-side member 54, in addition to the aforementioned connection portion 45. The case 46 is a cylindrical member, and has a first measurement air supply passage 55A and a second measurement air supply passage 55B formed in a thick plate portion thereof. The first measurement air supply passage 55A is connected to the aforementioned first measurement air supply passage 53A. The second measurement air supply passage 55B is connected to the aforementioned second measurement air supply passage 53B.

The proximal-end-side member 54 has a structure in which a distal end portion 61 and a proximal end portion 59 are formed respectively on distal and proximal sides of a shaft portion 60, the distal end portion 61 and the proximal end portion 59 having larger diameters than that of the shaft portion 60. The distal end portion 62 is disposed inside the case 46, and is capable of sliding in the axial direction while being in contact with an inner peripheral surface 46a of the case 46. The shaft portion 60 is inserted into a hole 62a of a proximal end side end plate 62 of the case 46, and is capable of moving in the axial direction. In addition, a coil spring 74 serving as an elastic member is interposed between the distal end portion 62 and the connection portion 45 (the spigot portion 48). The coil spring 74 is always pressing forward the measuring-head tip portion 43 (the connection portion 45). Accordingly, even if the measuring-head tip portion 43 comes into contact with the bush 31 during the insertion of the measuring-head tip portion 43 into the bush hole 31a, the coil spring 74 is compressed to cause the measuring-head tip portion 43 to move together with the case 46 toward the proximal end as indicated by an alternate long and short dash line in Part (a) of FIG. 3, so that the impact at the time of the contact is mitigated.

A first measurement air supply passage 63A and a second measurement air supply passage 63B are formed in the proximal-end-side member 54. A first hose 64A and a second hose 64B which are flexible are wound around an outer peripheral surface of the shaft portion 60. The first hose 64A connects the first measurement air supply passage 55A in the case 46 and the first measurement air supply passage 63A in the proximal-end-side member 54 to each other. The second hose 64B connects the second measurement air supply passage 55B in the case 46 and the second measurement air supply passage 63A in the proximal-end-side member 54 to each other. Accordingly, the first measurement air nozzle 51A is supplied with the measurement air through the first measurement air supply passage 63A, the first hose 64A, the first measurement air supply passage 55A, and the first measurement air supply passage 53A, while the second measurement air nozzle 51B is supplied with the measurement air through the second measurement air supply passage 63B, the second hose 64B, the second measurement air supply passage 55B, and the second measurement air supply passage 53B.

On the other hand, an air-blow air supply passage 65 is formed in the proximal-end-side member 54 (the distal end portion 61, the shaft portion 60, and the proximal end portion 59). Accordingly, the air-blow nozzles 52A, 52B, 52C, and 52D are supplied with the air-blow air through the air-blow air supply passage 65, a space portion 66 between the distal end portion 61 and the connection portion 45 (the spigot portion 48) in the case 46, and the air-blow air supply passage 56.

In addition, a rotary joint 67 is mounted on the outer peripheral surface of the proximal-end-side member 54. An attachment and detachment portion 68 is provided on the proximal end of the proximal-end-side member 54. The attachment and detachment portion 68 has a structure allowing the measuring head 41 to be attached to and detached from the main spindle 26 as in the case of the drilling tool 32.

A first measurement air supply passage 68A in the rotary joint 67 is connected through a first coupler 69A to a first measurement air supply passage 70A formed in the main-spindle head 25. A second measurement air supply passage 68B in the rotary joint 67 is connected through a second coupler 69B to a second measurement air supply passage 70B formed in the main-spindle head 25. Accordingly, the first measurement air supply passage 63A in the proximal-end-side member 54 is supplied with the measurement air from the first measurement air supply passage 70A in the main-spindle head 25 through the first measurement air supply passage 68A in the rotary joint 67, while the second measurement air supply passage 63B in the proximal-end-side member 54 is supplied with the measurement air from the second measurement air supply passage 70B in the main-spindle head 25 through the second measurement air supply passage 68B in the rotary joint 67.

In addition, a rotary joint 71 is mounted on the main spindle 26. An air-blow air supply passage 72 in the rotary joint 71 is connected to an air-blow air supply passage 73 formed in the main-spindle head 25. Accordingly, the air-blow air supply passage 65 in the proximal-end-side member 54 is supplied with the air-blow air from the air-blow air supply passage 73 in the main-spindle head 25 through the air-blow air supply passage 72 in the rotary joint 71 and an air-blow air supply passage 75 formed in the main spindle 26.

Next, the system configuration of the air micrometer and procedures of operation of gap measurement will be described on the basis of FIG. 4, Part (a) of FIG. 5 and Part (b) of FIG. 5, as well as FIG. 6. It should be noted that the following operation is performed by controlling the operations of the drive mechanisms of the respective axes, the rotation of the main-spindle motor, and the like, by use of an NC system (numerical control system) 78.

At the time of gap measurement, first, the measuring head 41 is mounted on the main spindle 26 in place of the drilling tool 32. Then, after the measuring head 41 is moved to the inlet of the bush hole 31a, air-blow air is supplied to the air-blow nozzles 52A, 52B, 52C, and 52D in the measuring-head tip portion 43 (the air-blow air supply passage 73 in the main-spindle head 25) from an air-blow air supply source 79. As a result, the air-blow air is jetted out from the air-blow nozzles 52A, 52B, 52C, and 52D toward the inner peripheral surface 31b of the bush hole 31a. Accordingly, if foreign matter, such as a chip, has been attached on the inner peripheral surface 31b, the foreign matter is blown out by the air-blow air and is removed from the inner peripheral surface 31b.

Thereafter, as shown in FIG. 4, the measuring-head tip portion 43 is inserted into the bush hole 31a. A measurement instruction is outputted from the NC system 78 to a sequencer 80, and then, a measurement-direction selection instruction and a measurement start instruction are outputted from the sequencer 80 to a control device 81 of the air micrometer. As a result, the control on A/D converters 77A and 77B as well as air supply sources 76A and 76B by the control device 81 is started, so that the gap measurement in the Y-axis direction and the gap measurement in the X-axis direction are performed. Any of these gap measurements in the Y-axis direction and in the X-axis direction may be performed first. For example, the gap measurement in the Y-axis direction is performed first as shown in Part (a) of FIG. 5. Subsequently, the measuring head 41 (measurement air 3) is rotated by 90 degrees by the control of the NC system 78 on the main spindle 26, and the gap measurement in the X-axis direction is performed, as shown in Part (b) of FIG. 5.

First, the gap measurement in the Y-axis direction will be described in detail. The measurement air with a pressure adjusted to be constant by pressure adjusting means such as a regulator is supplied, from the first measurement air supply source 76A and the second measurement air supply source 76B, through the first A/D converter 77A and the second A/D converter 77B, to the first measurement air nozzle 51A (the first measurement air supply passage 70A in the main-spindle head 25) and the second measurement air nozzle 51B (the second measurement air supply passage 70B in the main-spindle head 25) in the measuring-head tip portion 43, respectively. As a result, the measurement air is jetted from the first measurement air nozzle 51A and the second measurement air nozzle 51B respectively to gaps ΔY1 and ΔY2 each between the outer peripheral surface 43a of the measuring-head tip portion 43 and the inner peripheral surface 31b of the bush hole 31a. In this event, the first A/D converter 77A and the second A/D converter 77B detect the respective pressures of the measurement air (which correspond to the flow rates of the measurement air), convert the detection signals into digital signals, and output the digital signals to the control device 81.

The control device 81 obtains the flow rates of the measurement air from the pressure detection signals outputted respectively from the first A/D converter 77A and the second A/D converter 77B, and then obtains the gap ΔY1 and the gap ΔY2 on the basis of the data on the flow rates of the measurement air and pre-stored data representing the relationship between the flow rate of the measurement air and the gap, as shown in FIG. 6. Further, the control device 81 calculates an amount of eccentricity ΔY between the main spindle 26 (the drilling tool 32) and the bush hole 31a in the Y-axis direction on the basis of the measured values of the gaps ΔY1 and ΔY2 by the following equation (1), and outputs the amount of eccentricity ΔY to the sequencer 80:

$$\Delta Y = (\Delta Y1 - \Delta Y2) \div 2 \quad (1).$$

Next, the gap measurement in the X-axis direction will be described in detail. As in the case of the gap measurement in the Y-axis direction, the measurement air with a pressure adjusted to be constant by the pressure adjusting means such as a regulator is supplied, from the first measurement air supply source 76A and the second measurement air supply source 76B, through the first A/D converter 77A and the second A/D converter 77B, to the first measurement air nozzle 51A (the first measurement air supply passage 70A in the main-spindle head 25) and the second measurement air nozzle 51B (the second measurement air supply passage 70B in the main-spindle head 25) in the measuring-head tip portion 43, respectively. As a result, the measurement air is jetted from the first measurement air nozzle 51A and the second measurement air nozzle 51B respectively to gaps ΔX1 and ΔX2 each between the outer peripheral surface 43a of the measuring-head tip portion 43 and the inner peripheral surface 31b of the bush hole 31a. In this event, the first A/D converter 77A and the second A/D converter 77B detect the respective pressures of the measurement air (which correspond to the flow rates of the measurement air), convert the detection signals into digital signals, and output the digital signals to the control device 81.

The control device 81 obtains the flow rates of the measurement air from the pressure detection signals outputted respectively from the first A/D converter 77A and the second A/D converter 77B, and then obtains the gap ΔX1 and the gap ΔX2 on the basis of the data on the flow rates of the measurement air and pre-stored data representing the relationship between the flow rate of the measurement air and the gap, as shown in FIG. 6. Further, the control device 81 calculates an amount of eccentricity ΔX between the main spindle 26 (the drilling tool 32) and the bush hole 31a in the X-axis direction on the basis of the measured values of the gaps ΔX1 and ΔX2 by the following equation (2), and outputs the amount of eccentricity ΔX to the sequencer 80:

$$\Delta X = (\Delta X1 - \Delta X2) \div 2 \quad (2).$$

The sequencer 80 stores the amounts of eccentricity ΔX and ΔY received from the control device 81 into macro variables in the NC system 78. Then, the NC system 78 controls the position of the main spindle 26 (that is, corrects the relative position between the main spindle 26 and the bush hole 31a) by shifting the X and Y coordinates of the main spindle 26 in accordance with the amounts of eccentricity ΔX and ΔY. In this way, the NC system 78 causes the axis of the main spindle 26 (the drilling tool 32) and the axis of the bush hole 31a to coincide with each other, thereby preventing uneven wear of the bush hole 31a.

The data representing the relationship between the flow rate of the measurement air and the gap, as shown in FIG. 6, is obtained by calibrating the air micrometer using an air-micrometer calibration device (a master gauge) 91 as shown in Part (a) of FIG. 7 to Part (c) of FIG. 7.

As shown in Part (a) of FIG. 7 to Part (c) of FIG. 7, the air-micrometer calibration device 91 is housed in a housing hole 92. The place where the air-micrometer calibration device 91 is housed (the place where the housing hole 92 is provided) is set as desired, and may be set, for example, in the bush attachment jig 27 or a vicinity thereof, alternatively, in a tool housing portion or a vicinity thereof.

The air-micrometer calibration device 91 includes a clamping sleeve 93 provided in a middle of a measuring-head insertion hole 94, a small-diameter master hole (small size) 95, and a large-diameter master hole (large size) 96. The small-diameter master hole 95 has a diameter D1, while the large-diameter master hole 96 has a diameter D2 larger than D1. The clamping sleeve 93, the small-diameter master hole 95, and the large-diameter master hole 96 are arranged in series, and also, the axis of the clamping sleeve 93, the axis of the small-diameter master hole 95, and the axis of the large-diameter master hole 96 coincide with one another. The clamping sleeve 93 is a sleeve formed of a metal material or the like in a cylindrical shape.

In addition, a cylindrical hydraulic pressure chamber 97, which surrounds the periphery of the clamping sleeve 93, and a pressure oil supply passage 98, which is connected to the hydraulic pressure chamber 97, are formed in the air-micrometer calibration device 91. The pressure oil supply passage 98, the hydraulic pressure chamber 97, and the clamping sleeve 93 constitute positioning means. A flexible hose 99 is connected to the pressure oil supply passage 98. The air-micrometer calibration device 91 is in the floating state. Specifically, nothing inhibiting the air-micrometer calibration device 91 from moving in the radial direction of the master holes 95 and (the direction of the arrow T) is provided around the air-micrometer calibration device 91; accordingly, the air-micrometer calibration device 91 is capable of freely moving in the radial direction (the direction of the arrow T) in the housing hole 92.

Next, the procedures of calibration operation will be described on the basis of FIG. 4, Part (a) of FIG. 8 and Part (b) of FIG. 8. It should be noted that the following operation is performed by controlling the drive mechanisms of the respective axes, and the like, by use of the NC system (numerical control system) 78.

In the calibration, first, the measuring head 41 is moved to the inlet of the air-micrometer calibration device 91 (the measuring-head insertion hole 94). Then, air-blow air is supplied from the air-blow air supply source 79 to the air-blow nozzles 52A, 52B, 52C, and 52D in the measuring-head tip portion 43 (the air-blow air supply passage 73 in the main-spindle head 25). As a result, the air-blow air is jetted out toward an inner peripheral surface 93a of the clamping sleeve 93, an inner peripheral surface 95a of the small-diameter master hole 95, and an inner peripheral surface 96a of the large-diameter master hole 96. Accordingly, if foreign matter, such as a chip, has been attached to these inner peripheral surfaces 93a, 95a, and 96a, the foreign matter is blown out by the air-blow air and is removed from these inner peripheral surfaces 93a, 95a, and 96a. It should be noted that, if there is no possibility that foreign matter is attached to the inner peripheral surfaces 93a, 95a, and 96a because of the housing state of the air-micrometer calibration device 91, or the like, the air blow does not need to be performed.

At the start of the calibration, the measuring-head tip portion 43 is first inserted into the small-diameter master hole as shown in Part (a) of FIG. 8. At this time, the measuring-head body portion 42 (the case 46) is located inside the clamping sleeve 93. Then, when oil is supplied from an unillustrated pressure oil supply source to the hydraulic pressure chamber 97 through the hose 99 and the pressure oil supply passage 98, the hydraulic pressure in the hydraulic pressure chamber 97 acts on the entire clamping sleeve 93 as indicated by the arrow U, causing the diameter of the clamping sleeve 93 to be slightly reduced, so that the clamping sleeve 93 clamps the measuring-head body portion 42 (the case 46). As a result, the axis of the measuring-head tip portion 43 and the axis of the small-diameter master hole 95 are caused to coincide with each other. To put it differently, a gap ΔG1 between the outer peripheral surface 43a of the measuring-head tip portion 43 and the inner peripheral surface 95a of the small-diameter master hole 95 is made uniform (a predetermined value) entirely in the circumferential direction of the measuring-head tip portion 43 as shown in Part (b) of FIG. 8.

In this state, as in the case of the gap measurement, the measurement air with a pressure adjusted to be constant by the pressure adjusting means such as a regulator is supplied, from the first measurement air supply source 76A and the second measurement air supply source 76B, through the first A/D converter 77A and the second A/D converter 77B, to the first measurement air nozzle 51A (the first measurement air supply passage 70A in the main-spindle head 25) and the second measurement air nozzle 51B (the second measurement air supply passage 70B in the main-spindle head 25) in the measuring-head tip portion 43, respectively. As a result, these flows of the measurement air are jetted respectively from the first measurement air nozzle 51A and the second measurement air nozzle 51B to the gap ΔG1 between the outer peripheral surface 43a of the measuring-head tip portion 43 and the inner peripheral surface 95a of the small-diameter master hole 95. In this event, the first A/D converter 77A and the second A/D converter 77B detect the respective pressures of the measurement air (which correspond to the flow rates of the measurement air), convert the detection signals into digital signals, and output the digital signals to the control device 81, respectively.

Then, the control device 81 obtains the flow rate Q1 of the measurement air from the pressure detection signals outputted respectively from the first A/D converter 77A and the second A/D converter 77B, and stores data on the flow rate Q1 of the measurement air and pre-stored data on the gap ΔG1 as data of a point P1 representing the relationship between the flow rate Q1 of the measurement air and the gap ΔG1, as shown in FIG. 6.

Next, the pressure oil is discharged from the hydraulic pressure chamber 97 through the pressure oil supply passage 98 and the hose 99, so that the clamping of the measuring-head body portion 42 (the case 46) by the clamping sleeve 93 is once released. After that, the measuring-head tip portion 43 is inserted into the large-diameter master hole 96. Also in this case, the measuring-head body portion 42 (the case 46) is located inside the clamping sleeve 93. Then, in the same manner as described above, oil is supplied from the pressure oil supply source to the hydraulic pressure chamber 97 through the hose 99 and the pressure oil supply passage 98, so that the clamping sleeve 93 clamps the measuring-head body portion 42 (the case 46) with the hydraulic pressure in the hydraulic pressure chamber 97. As a result, the axis of the measuring-head tip portion 43 and the axis of the large-diameter master hole 96 are caused to coincide with each other. To put it differently, a gap ΔG2 between the outer peripheral surface 43a of the measuring-head tip portion 43 and the inner peripheral surface 96a of the large-diameter master hole 96 is made uniform (a predetermined value) entirely in the circumferential direction of the measuring-head tip portion 43 as shown in Part (b) of FIG. 8.

In this state, as in the case of the small-diameter master hole 95, the measurement air with a pressure adjusted to be constant by the pressure adjusting means such as a regulator is supplied, from the first measurement air supply source 76A and the second measurement air supply source 76B, through the first A/D converter 77A and the second A/D converter 77B, to the first measurement air nozzle 51A (the first measurement air supply passage 70A in the main-spindle head 25) and the second measurement air nozzle 51B (the second measurement air supply passage 70B in the main-spindle head 25) in the measuring-head tip portion 43, respectively. As a result, the measurement air is jetted from the first measurement air nozzle 51A and the second measurement air nozzle 51B to the gap ΔG2 between the outer peripheral surface 43a of the measuring-head tip portion 43 and the inner peripheral surface 96a of the large-diameter master hole 96. In this event, the first A/D converter 77A and the second A/D converter 77B detect the respective pressures of the measurement air (which correspond to the flow rates of the measurement air), convert the detection signals into digital signals, and output the digital signals to the control device 81.

Then, the control device 81 obtains the flow rate Q2 of the measurement air from the pressure detection signals outputted respectively from the first A/D converter 77A and the second A/D converter 77B, and stores data on the flow rate Q2 of the measurement air and pre-stored data on the gap ΔG2 as data of a point P2 representing the relationship between the flow rate Q2 of the measurement air and the gap ΔG2, as shown in FIG. 6. Moreover, data between the point P2 and the aforementioned P1 is obtained by linear interpolation.

Consequently, the data representing the relationship between the flow rate of the measurement air and the gap as shown by a solid line in FIG. 6 is obtained. Note that the change in the flow rate of the measurement air is not proportional to the change in the gap, in a range where the gap is very small and in a range where the gap is large as compared to the area of the flow passage in the measuring head, as indicated by the dash line in FIG. 6. For this reason, the measurement range for the air micrometer needs to be a range where the change in the flow rate of the measurement air is proportional to the change in the gap as indicated by the solid line in FIG. 6.

As described above, according to the measuring head 41 of Embodiment 1, provided is a measuring head 41 for an air micrometer configured to be mounted on the main spindle 26 of the machine tool 21 at the time of measurement and inserted into the bush hole 31a of the bush 31 attached to the work table 23 of the machine tool 21, for measuring the amount of eccentricity between the bush hole 31a and the main spindle 26. The measuring head 41 for an air micrometer is characterized as follows. Specifically, the measuring head 41 includes: the measuring-head body portion 42; and the measuring-head tip portion 43 provided on the distal end of the measuring-head body portion 42 and configured to be inserted into the bush hole 31a at the time of the measurement. In addition, the first measurement air nozzle 51A and the second measurement air nozzle 51B are formed to extend in the radial direction of the measuring-head tip portion 43 and have an angle of 180 degrees with respect to each other in the circumferential direction of the measuring-head tip portion 43. The first measurement air nozzle 51A and the second measurement air nozzle 51B are configured to blow measurement air to the gap between the outer peripheral surface 43a of the measuring-head tip portion 43 and the inner peripheral surface 31b of the bush hole 31a respectively through the jetting openings 51A-1 and 51B-1 in the outer peripheral surface 43a at the time of measurement. Moreover, the individual measurement air supply passages corresponding to the respective measurement air nozzles 51A and 51B (that is, the supply passage constituted of the first measurement air supply passages 53A, 55A, and 63A as well as the hose 64A, and the supply passage constituted of the first measurement air supply passages 53B, 55B, and 63B as well as the hose 64B) are formed in the measuring-head body portion 42. The measurement air is supplied to the measurement air nozzles 51A and 51B respectively from the individual measurement supply passages. With the above-described configuration, the measuring head 41 is capable of measuring, not the inner diameter of the bush hole 31a, but the gaps ΔX1 and ΔX2 as well as ΔY1 and ΔY2 between the outer peripheral surface 43a of the measuring-head tip portion 43 and the inner peripheral surface 31b of the bush hole 31a at both sides in the first radial direction (the X-axis direction) and at both sides in the second radial direction (the Y-axis direction) to each of which directions the measuring-head tip portion 43 is perpendicular, by rotating the measuring head 41 by 90 degrees by means of the main spindle 26. Accordingly, the amounts of eccentricity ΔX and ΔY between the main spindle 26 and the bush hole 31a are obtained on the basis of the measured values of the gaps ΔX1 and ΔX2 as well as ΔY1 and ΔY2 (for example, by calculation of the above-described equations (1) and (2)), and then, the position of the main spindle 26 is controlled in accordance with the amounts of eccentricity ΔX and ΔY (that is, the relative position between the main spindle 26 and the bush hole 31a is corrected), whereby the axis of the main spindle 26 (the drilling tool 32) and the axis of the bush hole 31a are caused to coincide with each other. Therefore, uneven wear of the bush hole 31a can be prevented.

In addition, the measuring head 41 for an air micrometer of Embodiment 1 is characterized by the following configuration. Specifically, the measurement air is supplied from the first measurement air supply passage 70A and the second measurement air supply passage 70A formed in the main-spindle head 25, through the first measurement air supply passage 68A and the second measurement air supply passage 68B in the rotary joint 67 mounted on the measuring-head body portion 42, to the first measurement air supply passage 63A and the second measurement air supply passage 63B in the measuring-head body portion 42, respectively. Accordingly, the following effect and the like can be obtained. The measurement air can be supplied from the main-spindle head 25, and there is no need to connect such supply means as a hose for supplying measurement air, directly to the measuring head 41. Therefore, operations for measurement, such as attachment and detachment of the measuring head 41 to and from the main spindle 26, are facilitated.

Moreover, the measuring head 41 for an air micrometer of Embodiment 1 is characterized as follows. Specifically, in the measuring-head tip portion 43, the air-blow nozzles 52A to 52D are formed for jetting the air-blow air toward the inner peripheral surface 31b of the bush hole 31a forward through the jetting openings 52A-1 to 52D-1 in the tapered surface 49 on the peripheral edge of the distal end of the measuring-head tip portion 43, at the time of measurement. In the measuring-head body portion 42, the air-blow air supply passages 56 and 65 are formed for supplying the air-blow air to the air-blow nozzles 52A to 52D. Accordingly, even if foreign matter, such as a chip, is attached onto the inner peripheral surface 31b of the bush hole 31a, it is possible to perform the gap measurement after removing the foreign matter from the inner peripheral surface 31b of the bush hole 31a with the air blow, so that highly-precise gap measurement can be performed.

Further, the measuring head 41 for an air micrometer of Embodiment 1 is characterized as follows. Specifically, the air-blow air is supplied from the air-blow air supply passage 73 formed in the main-spindle head 25, through the air-blow air supply passage 72 in the rotary joint 71 mounted on the main spindle 26 and the air-blow air supply passage 75 formed in the main spindle 26, to the air-blow air supply passage 65 in the measuring-head body portion 42. Accordingly, the following effect and the like can be obtained. The air-blow air can be supplied from the main-spindle head 25, and there is no need to connect supply means such as a hose for supplying air-blow air, directly to the measuring head 41. Therefore, operations for measurement, such as attachment and detachment of the measuring head 41 to and from the main spindle 26, are facilitated.

Furthermore, the measuring head 41 for an air micrometer of Embodiment 1 is characterized as follows. Specifically, the measuring-head body portion 42 includes: the distal-end-side member (the connection portion 45 and the case 46) to which the measuring-head tip portion 43 is fixed; the proximal-end-side member 54; the coil spring 74 interposed between the distal-end-side member (the connection portion 45 and the case 46) and the proximal-end-side member 54; and the flexible hoses 64A and 64B connecting the measurement air supply passages 55A and 55B formed in the distal-end-side member (the case 46) and the measurement air supply passages 63A and 63B in the proximal-end-side member 54 to each other, respectively. Accordingly, even if the measuring-head tip portion 43 comes into contact with the bush 31 during the insertion of the measuring-head tip portion 43 into the bush hole 31a, the coil spring 74 is compressed to cause the measuring-head tip portion 43 to move toward the proximal end, so that the impact at the time of the contact is mitigated.

Embodiment 2

Figure 9:
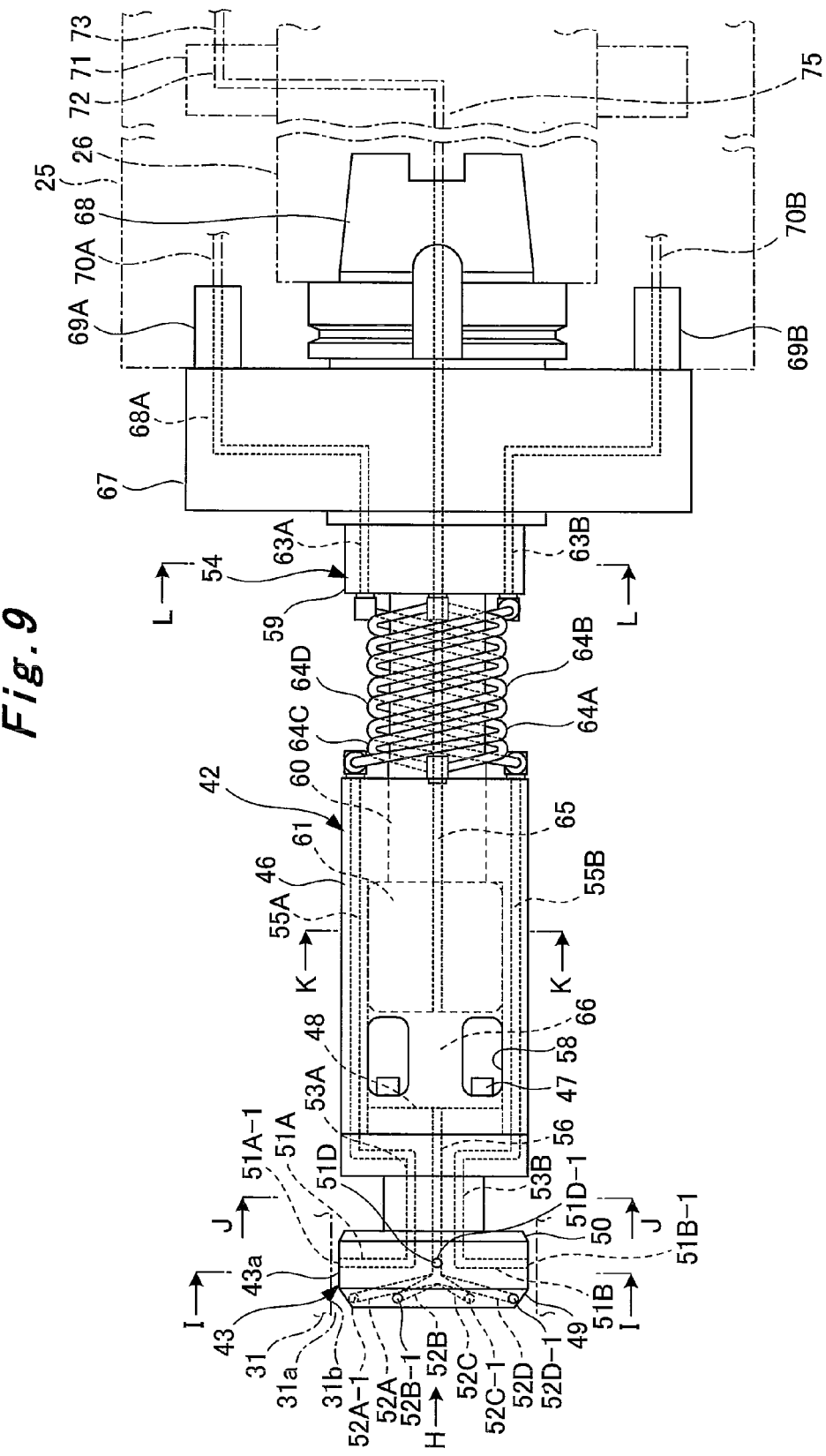
[FIG. 9]
Figure 10A:
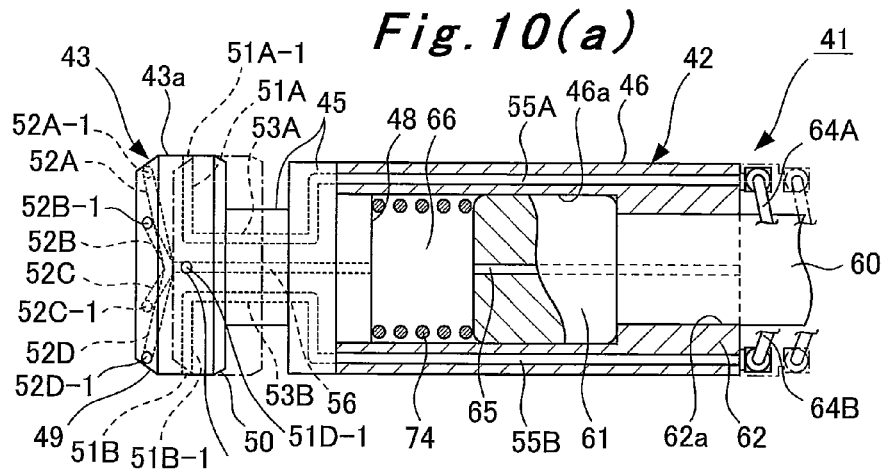
[FIG. 10] Part (a) of FIG. 10 is a cross-sectional view showing part of the measuring head, Part (b) of FIG. 10 is a view in the direction of the arrow H in FIG. 9, Part (c) of FIG. 10 is a cross-sectional view taken along the line I-I in FIG. 9 and viewed in the direction of the arrows I, Part (d) of FIG. 10 is a cross-sectional view taken along the line J-J in FIG. 9 and viewed in the direction of the arrows J, Part (e) of FIG. 10 is a cross-sectional view taken along the line K-K in FIG. 9 and viewed in the direction of the arrows K, and Part (f) of FIG. 10 is a cross-sectional view taken along the line L-L in FIG. 9 and viewed in the direction of the arrows L.
Figure 10B:
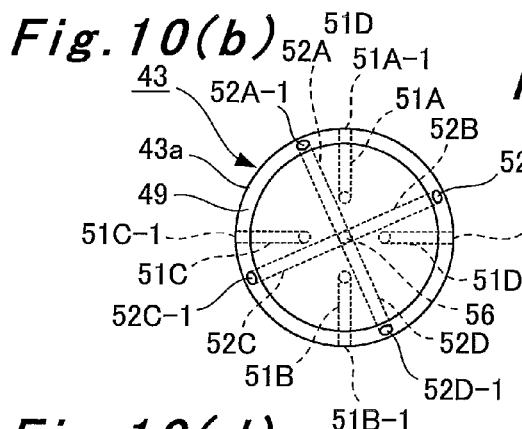
Figure 10C:
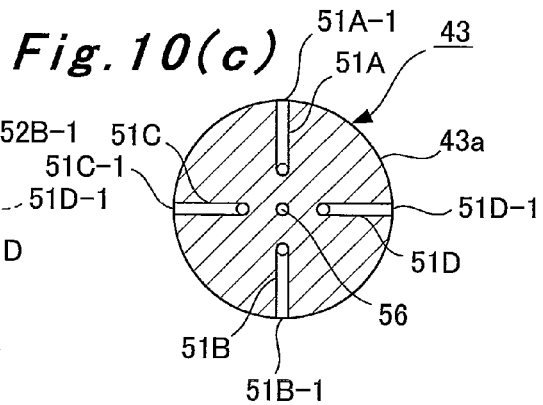
Figure 10D:
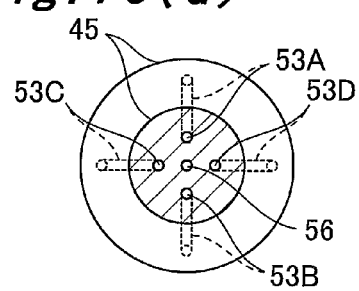
Figure 10E:
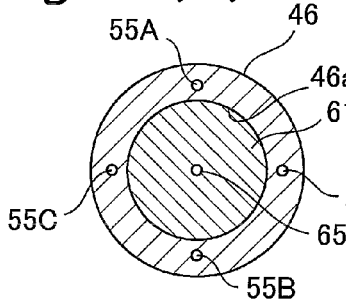
Figure 10F:
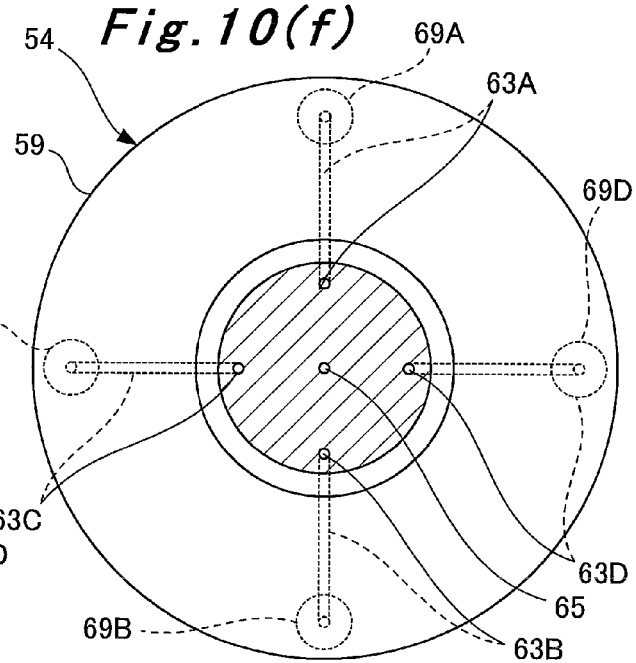
Figure 12:
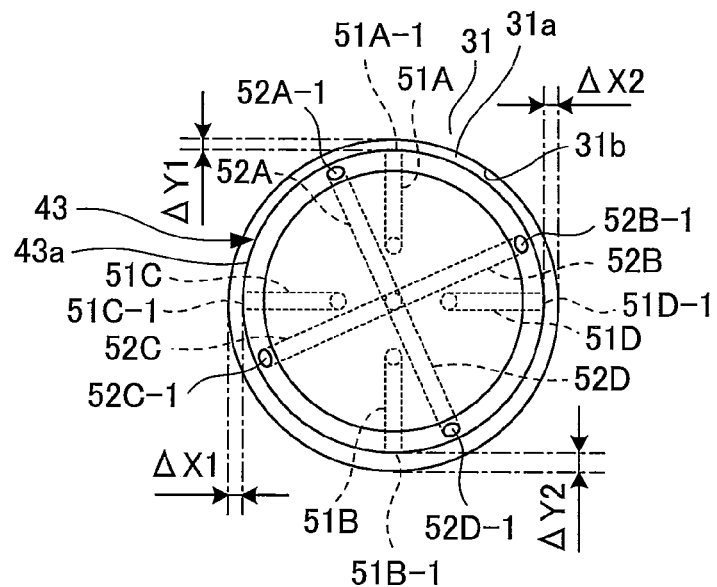
[FIG. 12]
Figure 13:
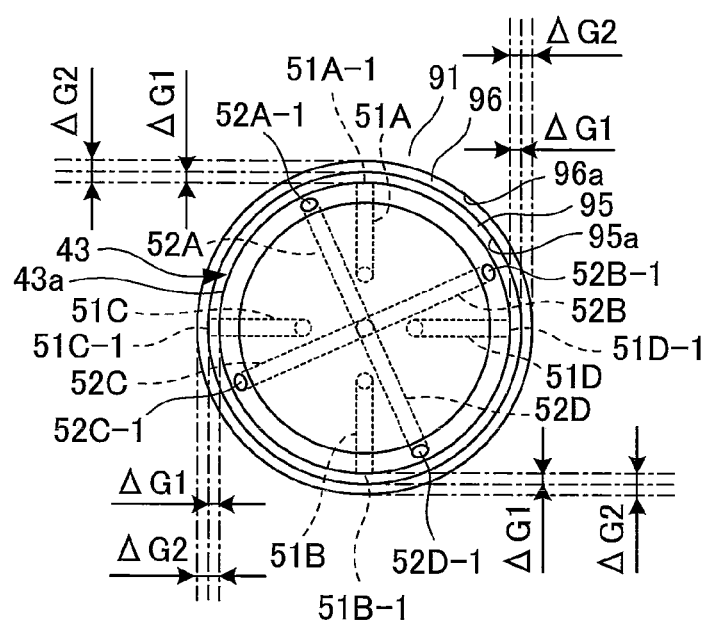
[FIG. 13]

FIG. 9 is a side view of a measuring head for an air micrometer according to Embodiment 2 of the present invention. Part (a) of FIG. 10 is a cross-sectional view showing part of the measuring head, Part (b) of FIG. 10 is a view in the direction of the arrow H in FIG. 9, Part (c) of FIG. 10 is a cross-sectional view taken along the line I-I in FIG. 9 and viewed in the direction of the arrows I, Part (d) of FIG. 10 is a cross-sectional view taken along the line J-J in FIG. 9 and viewed in the direction of the arrows J, Part (e) of FIG. 10 is a cross-sectional view taken along the line K-K in FIG. 9 and viewed in the direction of the arrows K, and Part (f) of FIG. 10 is a cross-sectional view taken along the line L-L in FIG. 9 and viewed in the direction of the arrows L. FIG. 11 is a system configurational diagram of the air micrometer. FIG. 12 is a view in the direction of the arrow M in FIG. 11. FIG. 13 is a view showing how the measuring head is calibrated using an air-micrometer calibration device (similar to Part (b) of FIG. 8).

It should be noted that an example of a machined tool for which the measuring head of Embodiment 2 is employed and a state where the measuring head is mounted on a main spindle are similar to those shown in Part (a) of FIG. 1 and Part (b) of FIG. 1, respectively, and accordingly will be neither illustrated in drawings nor described in detail herein. In addition, for the calibration of the measuring head of Embodiment 2, the air-micrometer calibration device 91 described in Embodiment 1 is employed (see FIG. 7 and FIG. 8). Therefore, the air-micrometer calibration device will not be described in detail herein.

In the measuring head 41 of Embodiment 1, the two measurement air nozzles 51A and 51B are formed in the measuring-head tip portion 43 (see FIG. 2 and FIG. 3). On the other hand, as shown in Part (b) of FIG. 10 and Part (c) of FIG. 10, a measuring head 41 of Embodiment 2 is characterized in that four measurement air nozzles 51A, 51B, 51C, and 51D are formed in a measuring-head tip portion 43, and the other configurations are generally the same as those in Embodiment 1. Accordingly, in the measuring head 41 of Embodiment 2, the same parts as those in Embodiment 1 will be given the same reference numerals, and the detailed description that has already been made will be omitted.

As shown in FIG. 9 and Part (a) of FIG. 10 to Part (d) of FIG. 10, the four measurement air nozzles 51A, 51B, 51C, and 51D are formed in the measuring-head tip portion 43 of the measuring head 41 of Embodiment 2. Each of these measurement air nozzles 51A to 51D has an angle of 90 degrees with respect to its adjacent ones in the circumferential direction of the measuring-head tip portion 43. In the measurement, the measurement air nozzles 51A, 51B, 51C, and 51D jet air toward gaps between an outer peripheral surface 43a of the measuring-head tip portion 43 and an inner peripheral surface 31b of a bush hole 31a through jetting openings 51A-1, 51B-1, 51C-1, and 51D-1 in the outer peripheral surface 43a. In addition, a first measurement air supply passage 53A connected to the first measurement air nozzle 51A, a second measurement air supply passage 53B connected to the second measurement air nozzle 51B, a third measurement air supply passage 53C connected to the third measurement air nozzle 51C, and a fourth measurement air supply passage 53D connected to the fourth measurement air nozzle 51D are formed in a connection portion 45 of a measuring-head body portion 42.

A first measurement air supply passage 55A, a second measurement air supply passage 55B, a third measurement air supply passage 55C, and a fourth measurement air supply passage 55D are formed in a wall portion of a case 46 of the measuring-head body portion 42. The first measurement air supply passage 55A is connected to the aforementioned first measurement air supply passage 53A. The second measurement air supply passage 55B is connected to the aforementioned second measurement air supply passage 53B. The third measurement air supply passage 55C is connected to the aforementioned third measurement air supply passage 53C. The fourth measurement air supply passage 55D is connected to the aforementioned fourth measurement air supply passage 53D.

A first measurement air supply passage 63A, a second measurement air supply passage 63B, the first measurement air supply passage 63A, the second measurement air supply passage 63B, a third measurement air supply passage 63C, and a fourth measurement air supply passage 63D are formed in a proximal-end-side member 54.

A first hose 64A, a second hose 64B, a third hose 64C, and a fourth hose 64D which are flexible are wound around an outer peripheral surface of a shaft portion 60. The first hose 64A connects the first measurement air supply passage 55A in the case 46 and the first measurement air supply passage 63A in the proximal-end-side member 54 to each other. The second hose 64B connects the second measurement air supply passage 55B in the case 46 and the second measurement air supply passage 63A in the proximal-end-side member 54 to each other. The third hose 64C connects the third measurement air supply passage 55C in the case 46 and the third measurement air supply passage 63C in the proximal-end-side member 54 to each other. The fourth hose 64D connects the fourth measurement air supply passage 55D in the case 46 and the fourth measurement air supply passage 63D in the proximal-end-side member 54 to each other.

Accordingly, the first measurement air nozzle 51A is supplied with the measurement air through the first measurement air supply passage 63A, the first hose 64A, the first measurement air supply passage 55A, and the first measurement air supply passage 53A. The second measurement air nozzle 51B is supplied with the measurement air through the second measurement air supply passage 63B, the second hose 64B, the second measurement air supply passage 55B, and the second measurement air supply passage 53B. The third measurement air nozzle 51C is supplied with the measurement air through the third measurement air supply passage 63C, the third hose 64C, the third measurement air supply passage 55C, and the third measurement air supply passage 53C. The fourth measurement air nozzle 51D is supplied with the measurement air through the fourth measurement air supply passage 63D, the fourth hose 64D, the fourth measurement air supply passage 55D, and the fourth measurement air supply passage 53D.

It should be noted that, in Embodiment 2, no rotary joint is mounted on the proximal-end-side member 54. The first measurement air supply passage 63A in the proximal-end-side member 54 is connected to a first measurement air supply passage 70A in the main-spindle head 25 through a first coupler 69A, and the second measurement air supply passage 63B is connected to a second measurement air supply passage 70B in the main-spindle head 25 through a second coupler 69B. Further, a third measurement air supply passage 63C is connected to a third measurement air supply passage (not illustrated) in the main-spindle head 25 through a third coupler (not illustrated), and a fourth measurement air supply passage 63D is connected to a fourth measurement air supply passage (not illustrated) in the main-spindle head 25 through a fourth coupler (not illustrated). Accordingly, the first measurement air supply passage 63A in the proximal-end-side member 54 is supplied with the measurement air from the first measurement air supply passage 70A in the main-spindle head 25. The second measurement air supply passage 63B in the proximal-end-side member 54 is supplied with the measurement air from the second measurement air supply passage 70B in the main-spindle head 25. The third measurement air supply passage 63C in the proximal-end-side member 54 is supplied with the measurement air from the third measurement air supply passage in the main-spindle head 25. The fourth measurement air supply passage 63D in the proximal-end-side member 54 is supplied with the measurement air from the fourth measurement air supply passage in the main-spindle head 25.

Next, the system configuration of the air micrometer and the procedures of operation of gap measurement will be described on the basis of FIG. 11, FIG. 12, and FIG. 6. It should be noted that the following operation is performed by controlling the operations of drive mechanisms of the respective axes, the rotation of a main-spindle motor, and the like, by use of an NC system 78.

In the gap measurement, air blow is performed first. Since the air blow is the same as that in the case of Embodiment 1, the air blow will not be described in detail. Thereafter, as shown in FIG. 11, the measuring-head tip portion 43 inserted into the bush hole 31a. After that, a measurement instruction is outputted from the NC system 78 to a sequencer 80, and then a measurement-direction selection instruction and a measurement start instruction are outputted from the sequencer 80 to a control device 81 of the air micrometer. As a result, the control on A/D converters 77A and 77B as well as air supply sources 76A and 76B by the control device 81 is started, so that the gap measurement in the Y-axis direction and the gap measurement in the X-axis direction are performed. Any of these gap measurements in the Y-axis direction and in the X-axis direction may be performed first, or these gap measurements may be performed at the same time. In Embodiment 2, since the four measurement air nozzles 51A to 51D are formed in the measuring-head tip portion 43, there is no need to rotate the measuring head 41 by 90 degrees as in the case of Embodiment 1.

The gap measurement in the Y-axis direction will be described in detail. The measurement air with a pressure adjusted to be constant by pressure adjusting means such as a regulator is supplied, from the first measurement air supply source 76A and the second measurement air supply source 76B, through the first A/D converter 77A and the second A/D converter 77B, to the first measurement air nozzle 51A (the first measurement air supply passage 70A in the main-spindle head 25) and the second measurement air nozzle 51B (the second measurement air supply passage 70B in the main-spindle head 25) in the measuring-head tip portion 43, respectively. As a result, the measurement air is jetted from the first measurement air nozzle 51A and the second measurement air nozzle 51B respectively to gaps $\Delta Y1$ and $\Delta Y2$ each between the outer peripheral surface 43a of the measuring-head tip portion 43 and the inner peripheral surface 31b of the bush hole 31a. In this event, the first A/D converter 77A and the second A/D converter 77B detect the respective pressures of the measurement air (which correspond to the flow rates of the measurement air), convert the detection signals into digital signals, and output the digital signals to the control device 81.

The control device 81 obtains the flow rates of the measurement air from the pressure detection signals outputted respectively from the first A/D converter 77A and the second A/D converter 77B, and then obtains the gap $\Delta Y1$ and the gap $\Delta Y2$ on the basis of the data on the flow rates of the measurement air and pre-stored data representing the relationship between the flow rate of the measurement air and the gap, as shown in FIG. 6. Further, the control device 81 calculates an amount of eccentricity $\Delta Y$ between the main spindle 26 (the drilling tool 32) and the bush hole 31a in the Y-axis direction on the basis of the measured values of the gaps $\Delta Y1$ and $\Delta Y2$ by the aforementioned equation (1), and outputs the amount of eccentricity $\Delta Y$ to the sequencer 80.

Next, the gap measurement in the X-axis direction will be described in detail. The measurement air with a pressure adjusted to be constant by the pressure adjusting means such as a regulator is supplied, from a third measurement air supply source 76C and a fourth measurement air supply source 76D, through a third A/D converter 77C and a fourth A/D converter 77D, to the third measurement air nozzle 51C (the third measurement air supply passage in the main-spindle head 25) and the fourth measurement air nozzle 51D (the fourth measurement air supply passage in the main-spindle head 25) in the measuring-head tip portion 43, respectively. As a result, the measurement air is jetted from the third measurement air nozzle 51C and the fourth measurement air nozzle 51D respectively to gaps $\Delta X1$ and $\Delta X2$ each between the outer peripheral surface 43a of the measuring-head tip portion 43 and the inner peripheral surface 31b of the bush hole 31a. In this event, the third A/D converter 77C and the fourth A/D converter 77D detect the respective pressures of the measurement air (which correspond to the flow rates of the measurement air), convert the detection signals into digital signals, and output the digital signals to the control device 81.

The control device 81 obtains the flow rates of the measurement air from the pressure detection signals outputted respectively from the third A/D converter 77C and the fourth A/D converter 77D, and then obtains the gap $\Delta X1$ and the gap $\Delta X2$ on the basis of the data on the flow rates of the measurement air and pre-stored data representing the relationship between the flow rate of the measurement air and the gap, as shown in FIG. 6. Further, the control device 81 calculates an amount of eccentricity $\Delta X$ between the main spindle 26 (the drilling tool 32) and the bush hole 31a in the X-axis direction on the basis of the measured values of the gaps $\Delta X1$ and $\Delta X2$ by the aforementioned equation (2), and outputs the amount of eccentricity $\Delta X$ to the sequencer 80.

The sequencer 80 stores the amounts of eccentricity $\Delta X$ and $\Delta Y$ received from the control device 81 into macro variables in the NC system 78. Then, the NC system 78 controls the position of the main spindle 26 (that is, corrects the relative position between the main spindle 26 and the bush hole 31a) by shifting the X and Y coordinates of the main spindle 26 in accordance with the amounts of eccentricity ΔX and ΔY. In this way, the NC system 78 causes the axis of the main spindle 26 (the drilling tool 32) and the axis of the bush hole 31a to coincide with each other, thereby preventing uneven wear of the bush hole 31a.

Also in Embodiment 2, the data representing the relationship between the flow rate of the measurement air and the gap, as shown in FIG. 6, is obtained by calibrating the air micrometer using the air-micrometer calibration device 91 described in Embodiment 1.

The procedures of calibration operation are also the same as those in the case of Embodiment 1. The procedures of calibration operation will be described on the basis of Part (a) of FIG. 8, FIG. 11, and FIG. 13. After the air blow is performed on the air-micrometer calibration device 91 as described above (or without the air blow being performed), the measuring-head tip portion 43 is first inserted into the small-diameter master hole 95. At this time, the measuring-head body portion 42 (the case 46) is located inside the clamping sleeve 93. Then, when oil is supplied from an unillustrated pressure oil supply source to the hydraulic pressure chamber 97 through the hose 99 and the pressure oil supply passage 98, the hydraulic pressure in the hydraulic pressure chamber 97 acts on the entire clamping sleeve 93, causing the diameter of the clamping sleeve 93 to be slightly reduced, so that the clamping sleeve 93 clamps the measuring-head body portion 42 (the case 46). As a result, the axis of the measuring-head tip portion 43 and the axis of the small-diameter master hole 95 are caused to coincide with each other. To put it differently, a gap ΔG1 between the outer peripheral surface 43a of the measuring-head tip portion 43 and the inner peripheral surface 95a of the small-diameter master hole 95 is made uniform (a predetermined value) entirely in the circumferential direction of the measuring-head tip portion 43 as shown in FIG. 13.

In this state, as in the case of the gap measurement, the measurement air with a pressure adjusted to be constant by the pressure adjusting means such as a regulator is supplied, from the first measurement air supply source 76A, the second measurement air supply source 76B, the third measurement air supply source 76C, and the fourth measurement air supply source 76D, through the first A/D converter 77A, the second A/D converter 77B, the third A/D converter 77C, and the fourth A/D converter 77D, to the first measurement air nozzle 51A (the first measurement air supply passage 70A in the main-spindle head 25), the second measurement air nozzle 51B (the second measurement air supply passage 70B in the main-spindle head 25), the third measurement air nozzle 51C (the third measurement air supply passage in the main-spindle head 25), and the fourth measurement air nozzle 51D (the third measurement air supply passage in the main-spindle head 25) in the measuring-head tip portion 43, respectively. As a result, these flows of the measurement air are jetted respectively from the first measurement air nozzle 51A, the second measurement air nozzle 51B, the third measurement air nozzle 51C, and the fourth measurement air nozzle 51D to the gap ΔG1 between the outer peripheral surface 43a of the measuring-head tip portion 43 and the inner peripheral surface 95a of the small-diameter master hole 95. In this event, the first A/D converter 77A, the second A/D converter 77B, the third A/D converter 77C, and the fourth A/D converter 77D detect the respective pressures of the measurement air (which correspond to the flow rates of the measurement air), convert the detection signals into digital signals, and output the digital signals to the control device 81, respectively.

Then, the control device 81 obtains the flow rate Q1 of the measurement air from the pressure detection signals outputted respectively from the first A/D converter 77A, the second A/D converter 77B, the third A/D converter 77C, and the fourth A/D converter 77D, and stores data on the flow rate Q1 of the measurement air and pre-stored data on the gap ΔG1 as data of a point P1 representing the relationship between the flow rate Q1 of the measurement air and the gap ΔG1, as shown in FIG. 6.

Next, the pressure oil is discharged from the hydraulic pressure chamber 97 through the pressure oil supply passage 98 and the hose 99, so that the clamping of the measuring-head body portion 42 (the case 46) by the clamping sleeve 93 is once released. After that, the measuring-head tip portion 43 is inserted into the large-diameter master hole 96. Also in this case, the measuring-head body portion 42 (the case 46) is located inside the clamping sleeve 93. Then, in the same manner as described above, the oil is supplied from the pressure oil supply source to the hydraulic pressure chamber 97 through the hose 99 and the pressure oil supply passage 98, so that the clamping sleeve 93 clamps the measuring-head body portion 42 (the case 46) with the hydraulic pressure in the hydraulic pressure chamber 97. As a result, the axis of the measuring-head tip portion 43 and the axis of the large-diameter master hole 96 are caused to coincide with each other. To put it differently, a gap ΔG2 between the outer peripheral surface 43a of the measuring-head tip portion 43 and the inner peripheral surface 96a of the large-diameter master hole 96 is made uniform (a predetermined value) entirely in the circumferential direction of the measuring-head tip portion 43 as shown in FIG. 13.

In this state, as in the case of the small-diameter master hole 95, the measurement air with a pressure adjusted to be constant by the pressure adjusting means such as a regulator is supplied, from the first measurement air supply source 76A, the second measurement air supply source 76B, the third measurement air supply source 76C, and the fourth measurement air supply source 76D, through the first A/D converter 77A, the second A/D converter 77B, the third A/D converter 77C, and the fourth A/D converter 77D, to the first measurement air nozzle 51A (the first measurement air supply passage 70A in the main-spindle head 25), the second measurement air nozzle 51B (the second measurement air supply passage 70B in the main-spindle head 25), the third measurement air nozzle 51C (the third measurement air supply passage in the main-spindle head 25), and the fourth measurement air nozzle 51D (the fourth measurement air supply passage in the main-spindle head 25) in the measuring-head tip portion 43, respectively. As a result, these flows of the measurement air are jetted respectively from the first measurement air nozzle 51A, the second measurement air nozzle 51B, the third measurement air nozzle 51C, and the fourth measurement air nozzle 51D to the gap ΔG2 between the outer peripheral surface 43a of the measuring-head tip portion 43 and the inner peripheral surface 96a of the large-diameter master hole 96. In this event, the first A/D converter 77A, the second A/D converter 77B, the third A/D converter 77C, and the fourth A/D converter 77D detect the respective pressures of the measurement air (which correspond to the flow rates of the measurement air), convert the detection signals into digital signals, and output the digital signals to the control device 81.

Then, the control device 81 obtains the flow rate Q2 of the measurement air from the pressure detection signals outputted respectively from the first A/D converter 77A, the second A/D converter 77B, the third A/D converter 77C, and the fourth A/D converter 77D, and stores data on the flow rate Q2 of the measurement air and pre-stored data on the gap ΔG2 as data of a point P2 representing the relationship between the flow rate Q2 of the measurement air and the gap ΔG2, as shown in FIG. 6. Moreover, data between the point P2 and the aforementioned P1 is obtained by linear interpolation. Consequently, the data representing the relationship between the flow rate of the measurement air and the gap as shown in FIG. 6 is obtained.

As described above, according to the measuring head 41 of Embodiment 2, provided is a measuring head 41 for an air micrometer configured to be mounted on the main spindle 26 of the machine tool 21 at the time of measurement and inserted into the bush hole 31a of the bush 31 attached to the work table 23 of the machine tool 21, for measuring the amount of eccentricity between the bush hole 31a and the main spindle 26. The measuring head 41 for an air micrometer is characterized as follows. Specifically, the measuring head 41 includes: the measuring-head body portion 42; and the measuring-head tip portion 43 provided on the distal end of the measuring-head body portion 42 and configured to be inserted into the bush hole 31a at the time of the measurement. In addition, the first measurement air nozzle 51A, the second measurement air nozzle 51B, the third measurement air nozzle 51O, and the fourth measurement air nozzle 51D are each formed to extend in the radial direction of the measuring-head tip portion 43, and also each formed to have an angle of 90 degrees with respect to its adjacent ones in the circumferential direction of the measuring-head tip portion 43. The first measurement air nozzle 51A, the second measurement air nozzle 51B, the third measurement air nozzle 51C, and the fourth measurement air nozzle 51D are configured to blow measurement air to the gap between the outer peripheral surface 43a of the measuring-head tip portion 43 and the inner peripheral surface 31b of the bush hole 31a respectively through the jetting openings 51A-1 to 51D-1 in the outer peripheral surface 43a at the time of measurement. Moreover, the individual measurement air supply passages corresponding to the respective measurement air nozzles 51A to 51D (that is, the supply passage constituted of the first measurement air supply passages 53A, 55A, and 63A as well as the hose 64A, the supply passage constituted of the first measurement air supply passages 53B, 55B, and 63B as well as the hose 64B, the supply passage constituted of the third measurement air supply passages 53C, 55C, and 63C as well as the hose 64C, and the supply passage constituted of the fourth measurement air supply passages 53D, 55D, and 63D as well as the hose 64D) are formed in the measuring-head body portion 42. The measurement air is supplied to the measurement air nozzles 51A to 51D respectively from the individual measurement supply passages. With the above-described configuration, the measuring head 41 is capable of measuring, not the inner diameter of the bush hole 31a, but the gaps ΔX1 and ΔX2 as well as ΔY1 and ΔY2 between the outer peripheral surface 43a of the measuring-head tip portion 43 and the inner peripheral surface 31b of the bush hole 31a at both sides in the first radial direction (the X-axis direction) and at both sides in the second radial direction (the Y-axis direction) to each of which directions the measuring-head tip portion 43 is perpendicular. Accordingly, the amounts of eccentricity ΔX and ΔY between the main spindle 26 and the bush hole 31a are obtained on the basis of the measured values of the gaps ΔX1 and ΔX2 as well as ΔY1 and ΔY2 (for example, by calculation of the above-described equations (1) and (2)), and then, the position of the main spindle 26 is controlled in accordance with the amounts of eccentricity ΔX and ΔY (that is, the relative position between the main spindle 26 and the bush hole 31a is corrected), whereby the axis of the main spindle 26 (the drilling tool 32) and the axis of the bush hole 31a are caused to coincide with each other. Therefore, uneven wear of the bush hole 31a can be prevented.

In addition, the measuring head 41 for an air micrometer of Embodiment 2 is characterized by the following configuration. Specifically, the measurement air is supplied from the first measurement air supply passage 70A, the second measurement air supply passage 70A, the third measurement air supply passage, and the fourth measurement air supply passage formed in the main-spindle head 25 to the first measurement air supply passage 63A, the second measurement air supply passage 63B, the third measurement air supply passage 63C, and the fourth measurement air supply passage 63D in the measuring-head body portion 42, respectively. Accordingly, the following effect and the like can be obtained. The measurement air can be supplied from the main-spindle head 25, and there is no need to connect such supply means as a hose for supplying measurement air directly to the measuring head 41. Therefore, operations for measurement, such as attachment and detachment of the measuring head 41 to and from the main spindle 26, are facilitated.

Moreover, the measuring head 41 for an air micrometer of Embodiment 2 is characterized as follows. Specifically, in the measuring-head tip portion 43, the air-blow nozzles 52A to 52D are formed for jetting the air-blow air toward the inner peripheral surface 31b of the bush hole 31a forward through the jetting openings 52A-1 to 52D-1 in the tapered surface 49 on the peripheral edge of the distal end of the measuring-head tip portion 43, at the time of measurement. In the measuring-head body portion 42, the air-blow air supply passages 56 and 65 are formed for supplying the air-blow air to the air-blow nozzles 52A to 52D. Accordingly, even if foreign matter, such as a chip, is attached onto the inner peripheral surface 31b of the bush hole 31a, it is possible to perform the gap measurement after removing the foreign matter from the inner peripheral surface 31b of the bush hole 31a with the air blow, so that highly-precise gap measurement can be performed.

Further, the measuring head 41 for an air micrometer of Embodiment 2 is characterized as follows. Specifically, the air-blow air is supplied from the air-blow air supply passage 73 formed in the main-spindle head 25, through the air-blow air supply passage 72 in the rotary joint 71 mounted on the main spindle 26 and the air-blow air supply passage 75 formed in the main spindle 26, to the air-blow air supply passage 65 in the measuring-head body portion 42. Accordingly, the following effect and the like can be obtained. The air-blow air can be supplied from the main-spindle head 25, and there is no need to connect supply means such as a hose for supplying air-blow air, directly to the measuring head 41. Therefore, operations for measurement, such as attachment and detachment of the measuring head 41 to and from the main spindle 26, are facilitated.

Furthermore, the measuring head 41 for an air micrometer of Embodiment 2 is characterized as follows. Specifically, the measuring-head body portion 42 includes: the distal-end-side member (the connection portion 45 and the case 46) to which the measuring-head tip portion 43 is fixed; the proximal-end-side member 54; the coil spring 74 interposed between the distal-end-side member (the connection portion 45 and the case 46) and the proximal-end-side member 54; and the flexible hoses 64A and 64B connecting the measurement air supply passages 55A and 55B formed in the distal-end-side member (the case 46) and the measurement air supply passages 63A and 63B in the proximal-end-side member 54 to each other, respectively. Accordingly, even if the measuring-head tip portion 43 comes into contact with the bush 31 during the insertion of the measuring-head tip portion 43 into the bush hole 31a, the coil spring 74 is compressed to cause the measuring-head tip portion 43 to move toward the proximal end, so that the impact at the time of the contact is mitigated.

Embodiment 3

Figure 15:
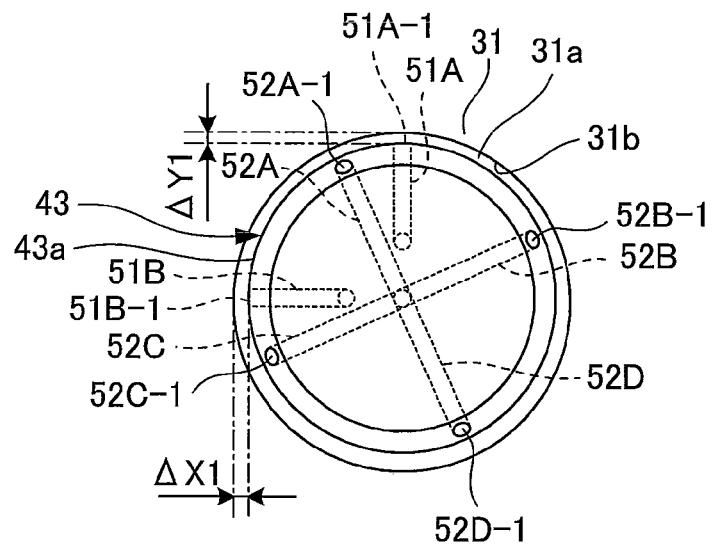
[FIG. 15]
Figure 16:
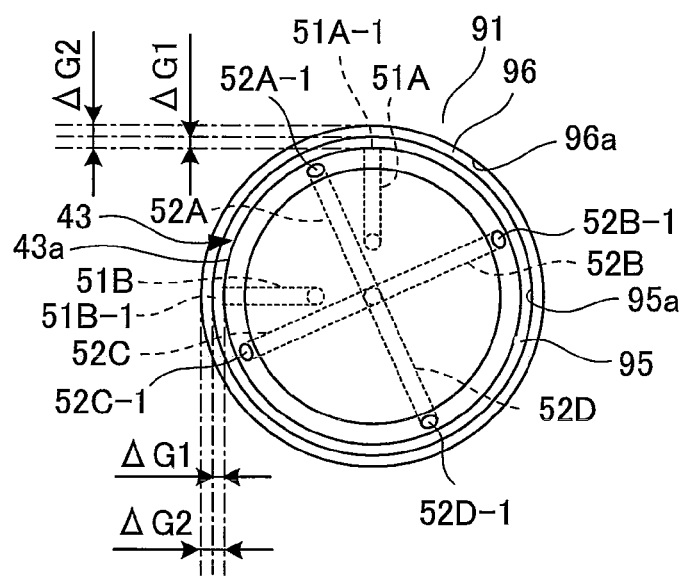
[FIG. 16]
Figure 17A:
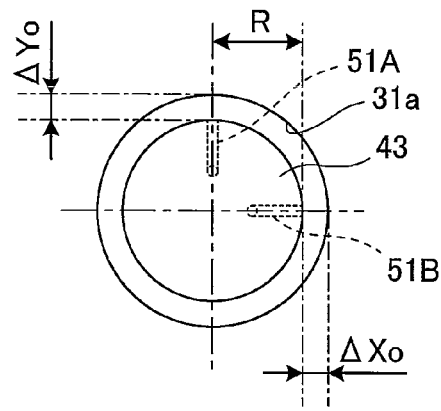
[FIG. 17]
Figure 17B:
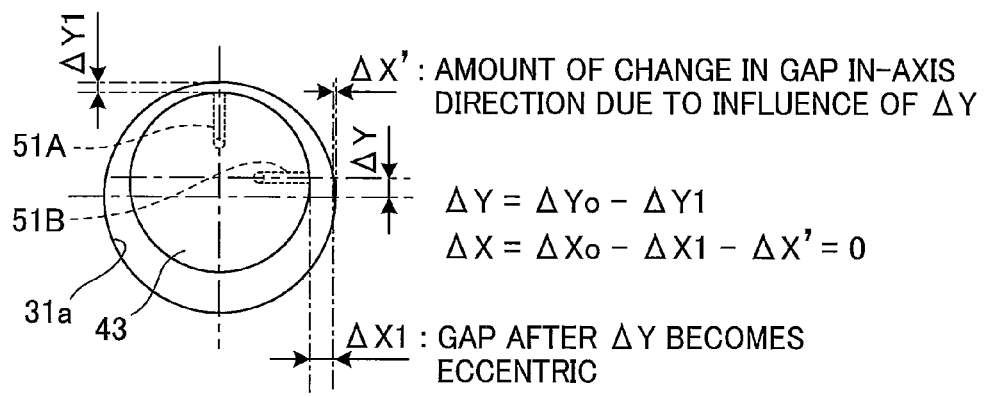
Figure 17C:
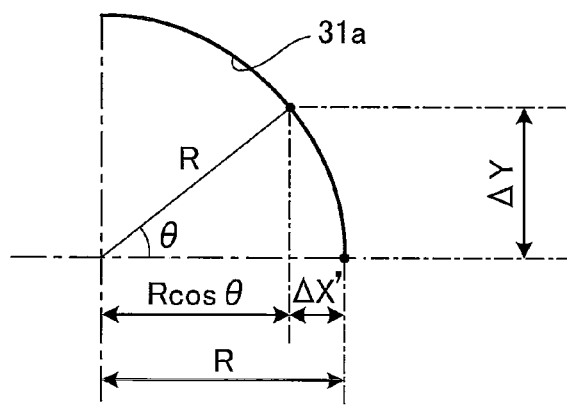
Figure 18A:
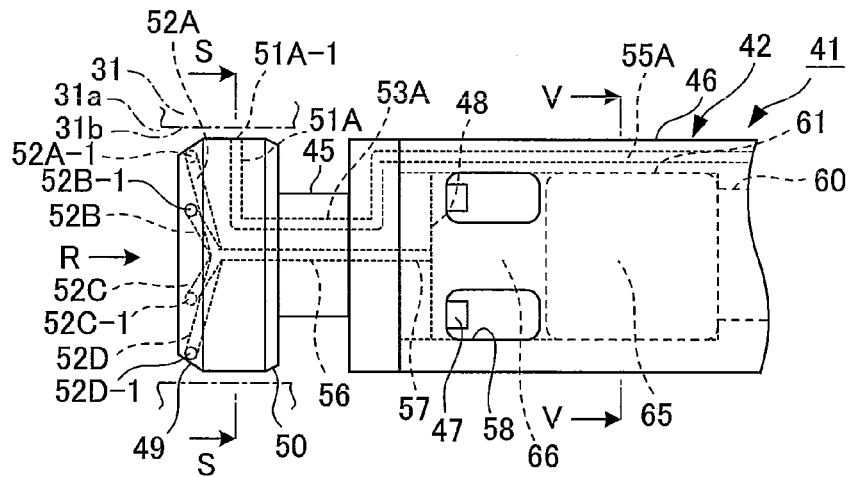
[FIG. 18] Part (a) of FIG. 18 is a side view of a main part of a measuring head for an air micrometer according to Embodiment 4 of the present invention, Part (b) of FIG. 18 is a view in the direction of the arrow R in Part (a) of FIG. 18, Part (c) of FIG. 18 is a cross-sectional view taken along the line S-S in Part (a) of FIG. 18 and viewed in the direction of the arrows S, and Part (d) of FIG. 18 is a cross-sectional view taken along the line V-V in Part (a) of FIG. 18 and viewed in the direction of the arrow V.
Figure 18B:
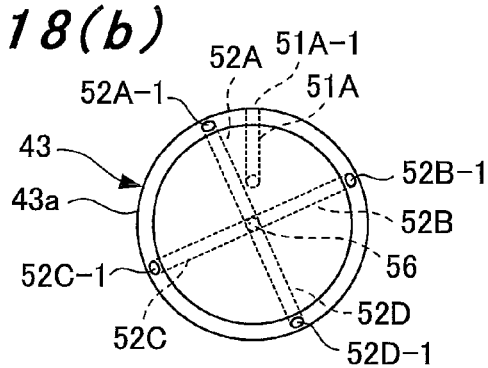
Figure 18C:
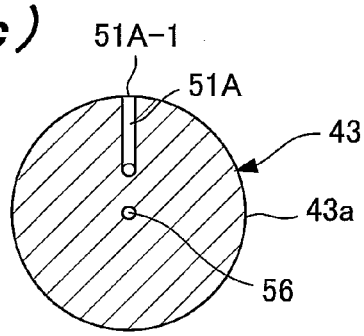
Figure 18D:
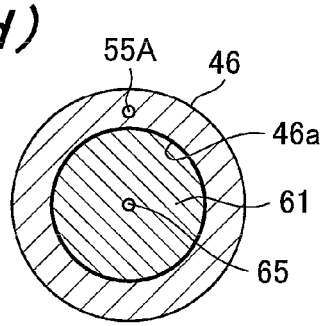

Part (a) of FIG. 14 is a side view of a main part of a measuring head for an air micrometer according to Embodiment 3 of the present invention, Part (b) of FIG. 14 is a view in the direction of the arrow N in Part (a) of FIG. 14, Part (c) of FIG. 14 is a cross-sectional view taken along the line O-O in Part (a) of FIG. 14 and viewed in the direction of the arrows O, Part (d) of FIG. 14 is a cross-sectional view taken along the line P-P in Part (a) of FIG. 14 and viewed in the direction of the arrows P, and Part (e) of FIG. 14 is a cross-sectional view taken along the line Q-Q in Part (a) of FIG. 14 and viewed in the direction of the arrows Q. FIG. 15 is a view showing how gap measurement is performed by the measuring head (similar to FIG. 5). FIG. 16 is a view showing how the measuring head is calibrated using an air-micrometer calibration device (similar to Part (b) of FIG. 8). Moreover, FIG. 17 shows a method of calculating an amount of eccentricity. Part (a) of FIG. 17 is a view showing a state where a measuring-head tip portion and a bush hole are not eccentric from each other, Part (b) of FIG. 17 is a view showing a state where the measuring-head tip portion is eccentric from the bush hole only in the X-axis direction, and Part (c) of FIG. 17 is a main-part enlarged view of the state shown in Part (b) of FIG. 17.

It should be noted that an example of a machine tool for which the measuring head of Embodiment 3 is employed and a state where the measuring head is mounted on a main spindle are similar to those shown in Part (a) of FIG. 1 and Part (b) of FIG. 1, respectively, and accordingly will be neither illustrated in drawings nor described in detail herein. In addition, for the calibration of the measuring head of Embodiment 3, the air-micrometer calibration device 91 described in Embodiment 1 is employed (see FIG. 7 and FIG. 8). Therefore, the air-micrometer calibration device will not be described in detail herein. Moreover, in the measuring head of Embodiment 3, the same parts as those in Embodiment 1 will be given the same reference numerals, the detailed description that has already been made will be omitted, and the illustration of the proximal end portion of the measuring-head body portion is omitted.

In the measuring head 41 of Embodiment 1, the first measurement air nozzle 51A and the second measurement air nozzle 51B formed in the measuring-head tip portion 43 have an angle of 180 degrees with respect to each other in the circumferential direction of the measuring-head tip portion 43 (see FIG. 2 and FIG. 3). On the other hand, as shown in Part (a) of FIG. 14 to Part (d) of FIG. 14, a measuring head 41 of Embodiment 3 is characterized in that a first measurement air nozzle 51A and a second measurement air nozzle 51B formed in a measuring-head tip portion 43 have an angle of 90 degrees with respect to each other in a circumferential direction of a measuring-head tip portion 43. Accordingly, measurement air supply passages and hoses in each part, such as measurement air supply passages 53A and 53B in a connection portion 45 as well as measurement air supply passages 55A and 55B in a case 46, are also arranged in conformity with the arrangement of the first and second measurement air nozzles 51A and 51B.

The other part has the same configuration as that in Embodiment 1. It should be noted that, although not illustrated, no rotary joint is mounted on the measuring head 41 of Embodiment 3 as in the case of the measuring head 41 of Embodiment 2 (see FIG. 9); therefore, Embodiment 3 is different from Embodiment 1 in that the rotary joint 67 (the first and second measurement air supply passages 68A and 68B) is not interposed in the course of the supply passages for the measurement air.

In addition, although neither illustrated nor described in detail, the system configuration of an air micrometer and the procedures of operation of gap measurement are also the same as those of Embodiment 1 (see FIG. 4). It should be noted, however, that, since the first measurement air nozzle 51A and the second measurement air nozzle 51B are arranged to make an angle of 90 degrees with respect to each other as shown in FIG. 15, it is possible to measure the gap $\Delta Y1$ in the Y-axis direction with the first measurement air nozzle 51A and to measure the gap $\Delta X1$ in the X-axis direction with the second measurement air nozzle 51S, without rotating the measuring head 41. Therefore, Embodiment 3 is different in this point from Embodiment 1.

In this case, a control device 81 (see FIG. 4) calculates the amounts of eccentricity $\Delta X$ and $\Delta Y$ by subtracting these measured values of the gaps $\Delta X1$ and $\Delta Y1$ from values of gaps which are stored in advance in the control device 81, and which are those between the outer peripheral surface 43a of the measuring-head tip portion 43 and the inner peripheral surface 31b of the bush hole 31a at the time when there is no eccentricity. Specifically, the amounts of eccentricity $\Delta X$ and $\Delta Y$ are calculated by any one of a first eccentricity amount calculating method and a second eccentricity amount calculating method which will be described below.

(First Eccentricity Amount Calculating Method)

The first eccentricity amount calculating method is a method of obtaining the amounts of eccentricity $\Delta X$ and $\Delta Y$ by solving the following simultaneous equations (3) and (4):

$$\Delta X = \Delta X_0 - \Delta X1 - R(1-\cos(\sin^{-1}(\Delta Y/R))) \qquad (3); \text{ and}$$

$$\Delta Y = \Delta Y_0 - \Delta Y1 - R(1-\cos(\sin^{-1}(\Delta X/R))) \qquad (4).$$

In the above-described equations (3) and (4), $\Delta X_0$ and $\Delta Y_0$, represent values of gaps in the X-axis direction and the Y-axis direction, respectively, which are inputted as initial values to the control device 81 in advance, that is, values of gaps between the outer peripheral surface 43a of the measuring-head tip portion 43 and the inner peripheral surface 31b of the bush hole 31a at the time when there is no eccentricity. R represents the radius of the bush hole 31a, which is inputted to the control device 81 in advance. It should be noted that it is also possible to input the radius r of the measuring-head tip portion 43 to the control device 81 in advance, and then to calculate the initial values $\Delta X_0$ and $\Delta Y_0$ from the difference (R−r) between r and R. The gaps $\Delta X1$ and $\Delta Y1$ are obtained, in the control device 81, by obtaining the flow rates of measurement air from pressure detection signals (digital signals) received from A/D converters 77A and 77B (see FIG. 4), and then obtaining the gaps $\Delta X1$ and $\Delta Y1$ on the basis of data on the flow rates of the measurement air and pre-stored data representing the relationship between the flow rate of measurement air and the gap, as in the case of Embodiment 1.

Detailed description will be given on the basis of FIG. 17. Consider a case where the value of gap in the Y-axis direction, which is measured by the first measurement air nozzle 51A, is changed from the initial value $\Delta Y_0$ to the value $\Delta Y1$ because the measuring-head tip portion 43 becomes eccentric only in the Y-axis direction by $\Delta Y$ with respect to the bush hole 31a as shown in Part (b) of FIG. 17 from the state where the measuring-head tip portion 43 and the bush hole 31a are not eccentric from each other as shown in Part (a) of FIG. 17. In this case, the amount of eccentricity $\Delta Y$ in the Y-axis direction can be obtained by the following equation (5):

$$\Delta Y = \Delta Y_0 - \Delta Y1 \qquad (5).$$

However, although not actually becoming eccentric, the value of gap in the X-axis direction, which is measured by the second measurement air nozzle 51B, changes by $\Delta X$ from the initial value to $\Delta X1$ because of an influence of $\Delta Y$, as shown in Part (b) of FIG. 17. Accordingly, when the amount of change in gap $\Delta X'$ in the X-axis direction due to the influence of $\Delta Y$ is taken into consideration, the amount of eccentricity $\Delta X$ in the X-axis direction can be obtained by the following equation (6). In the case of Part (b) of FIG. 17, the amount of eccentricity $\Delta X$ is 0:

$$\Delta X = \Delta X_0 - \Delta X1 - \Delta X' \qquad (6).$$

Then, as shown in Part (c) of FIG. 17, the amount of change $\Delta X'$ can be obtained by the following equation (7). Therefore, the equation (3) can be obtained by substituting the equation (7) into the equation (6):

$$\Delta X' = R - R\cos\theta = R(1 - \cos(\sin^{-1}(\Delta Y/R))). \qquad (7)$$

Although not described in detail, the same applies to the Y-axis direction as in the case of the X-axis direction. With the measuring-head tip portion 43 becoming eccentric only in the X-axis direction by $\Delta X$ with respect to the bush hole 31a, if the amount of change in gap $\Delta Y'$ in the Y-axis direction due to an influence of $\Delta X$ is taken into consideration, the amount of eccentricity $\Delta Y$ in the Y-axis direction can be obtained by the following equation (8):

$$\Delta Y = \Delta Y_0 - \Delta Y1 - \Delta Y' \qquad (8).$$

Then, since the amount of change $\Delta Y'$ can be obtained by the following equation (9), the equation (4) can be obtained by substituting the equation (9) into the equation (8):

$$\Delta Y' = R - R\cos\theta = R(1 - \cos(\sin^{-1}(\Delta X/R))). \qquad (9)$$

(Second Eccentricity Amount Calculating Method)

The second eccentricity amount calculating method is a method of obtaining the amounts of eccentricity $\Delta X$ and $\Delta Y$ by the following equations (10) and (11) with the above-describe amounts of change $\Delta X'$ and $\Delta Y'$ not taken into consideration:

$$\Delta X = \Delta X_0 - \Delta X1 \qquad (10);$$

$$\Delta Y = \Delta Y_0 - \Delta Y1 \qquad (11).$$

Since the amounts of eccentricity $\Delta X$ and $\Delta Y$ are very much smaller than the radius R of the bush hole 31a ($\Delta X$, $\Delta Y \ll R$), an influence of the amount of eccentricity in one direction out of the X-axis and Y-axis directions on the measured value of gap in the other direction is small. For this reason, the amounts of change $\Delta X'$ and $\Delta Y'$ can be ignored. Specifically, when $\Delta Y \ll R$, $\Delta Y/R \approx 0$, and therefore, $\Delta X' \approx 0$. On the other hand, when $\Delta X \ll R$, $\Delta X/R \approx 0$, and therefore, $\Delta Y' \approx 0$. For example, when $\Delta Y = 0.010$ mm and $R = 10$ mm, $\cos(\sin(0.010/10)) = 0.9999995$, and $\Delta X' = 10(1 - 0.9999995) = 0.000005$ m $= 0.005$ μm. Consequently, $\Delta X'/\Delta Y = 0.000005/0.010 = 0.0005 = 0.05\%$. Moreover, when $\Delta Y = 0.010$ mm and $R = 5$ mm, $\Delta X' = 0.00001$ mm $= 0.01$ μm. Consequently, $\Delta X'/\Delta Y = 0.001 = 0.1\%$. Then, these values 0.005 μm and 0.01 μm of the amounts of change $\Delta X'$ are sufficiently smaller than the repeat measurement accuracy 1.5 μm of the air micrometer. The same applies to the amount of change $\Delta Y'$. Therefore, the amounts of change $\Delta X'$ and $\Delta Y'$ can be ignored.

The calibration of the measuring head 41 in Embodiment 3 is the same as that in the case of Embodiment 1. Specifically, the air-micrometer calibration device 91 described in Embodiment 1 is used to obtain data representing the relationship between the gaps $\Delta G1$ and $\Delta G2$ as shown in FIG. 16 and the flow rates of measurement air (see FIG. 6).

As described above, according to the measuring head 41 of Embodiment 3, provided is a measuring head 41 for an air micrometer configured to be mounted on the main spindle 26 of the machine tool 21 at the time of measurement and inserted into the bush hole 31a of the bush 31 attached to the work table 23 of the machine tool 21, for measuring the amount of eccentricity between the bush hole 31a and the main spindle 26. The measuring head 41 for an air micrometer is characterized as follows. Specifically, the measuring head 41 includes: the measuring-head body portion 42; and the measuring-head tip portion 43 provided on the distal end of the measuring-head body portion 42 and configured to be inserted into the bush hole 31a at the time of the measurement. In addition, the first measurement air nozzle 51A and the second measurement air nozzle 51B are formed to extend in the radial direction of the measuring-head tip portion 43 and have an angle of 90 degrees with respect to each other in the circumferential direction of the measuring-head tip portion 43. The first measurement air nozzle 51A and the second measurement air nozzle 51B are configured to blow measurement air to the gap between the outer peripheral surface 43a of the measuring-head tip portion 43 and the inner peripheral surface 31b of the bush hole 31a respectively through the jetting openings 51A-1 and 51B-1 in the outer peripheral surface 43a at the time of measurement. Moreover, the individual measurement air supply passages corresponding to the respective measurement air nozzles 51A and 51B (that is, the supply passage constituted of the first measurement air supply passages 53A, 55A, and 63A as well as the hose 64A, and the supply passage constituted of the first measurement air supply passages 53B, 55B, and 63B as well as the hose 64B) are formed in the measuring-head body portion 42. The measurement air is supplied to the measurement air nozzles 51A and 51B respectively from the individual measurement air supply passages. With the above-described configuration, the measuring head 41 is capable of measuring, not the inner diameter of the bush hole 31a, but the gaps $\Delta X1$ and $\Delta Y1$ between the outer peripheral surface 43a of the measuring-head tip portion 43 and the inner peripheral surface 31b of the bush hole 31a in the first radial direction (the X-axis direction) and the second radial direction (the Y-axis direction) to each of which directions the measuring-head tip portion 43 is perpendicular. Accordingly, the amounts of eccentricity $\Delta X$ and $\Delta Y$ between the main spindle 26 and the bush hole 31a are obtained on the basis of the measured values of the gaps $\Delta X1$ and $\Delta Y1$ (for example, by subtracting the measured values of the gaps $\Delta X1$ and $\Delta Y1$ from values of gaps between the outer peripheral surface of the measuring-head tip portion and the inner peripheral surface of the bush hole at the time when there is no eccentricity), and then, the position of the main spindle 26 is controlled in accordance with the amounts of eccentricity $\Delta X$ and $\Delta Y$ (that is, the relative position between the main spindle 26 and the bush hole 31a is corrected), whereby the axis of the main spindle 26 (the drilling tool 32) and the axis of the bush hole 31a are caused to coincide with each other. Therefore, uneven wear of the bush hole 31a can be prevented.

In addition, the measuring head 41 for an air micrometer of Embodiment 3 is characterized by the following configuration. Specifically, the measurement air is supplied from the first measurement air supply passage 70A and the second measurement air supply passage 70A formed in the main-spindle head 25 to the first measurement air supply passage 63A and the second measurement air supply passage 63B in the measuring-head body portion 42, respectively. Accordingly, the following effect and the like can be obtained. The measurement air can be supplied from the main-spindle head 25, and there is no need to connect such supply means as a hose for supplying measurement air, directly to the measuring head 41. Therefore, operations for measurement, such as attachment and detachment of the measuring head 41 to and from the main spindle 26, are facilitated.

Moreover, the measuring head 41 for an air micrometer of Embodiment 3 is characterized as follows. Specifically, in the measuring-head tip portion 43, the air-blow nozzles 52A to 52D are formed for jetting the air-blow air toward the inner peripheral surface 31b of the bush hole 31a forward through the jetting openings 52A-1 to 52D-1 in the tapered surface 49 on the peripheral edge of the distal end of the measuring-head tip portion 43, at the time of measurement. In the measuring-head body portion 42, the air-blow air supply passages 56 and 65 are formed for supplying the air-blow air to the air-blow nozzles 52A to 52D. Accordingly, even if foreign matter, such as a chip, is attached onto the inner peripheral surface 31b of the bush hole 31a, it is possible to perform the gap measurement after removing the foreign matter from the inner peripheral surface 31b of the bush hole 31a with the air blow, so that highly-precise gap measurement can be performed.

Further, the measuring head 41 for an air micrometer of Embodiment 3 is characterized as follows. Specifically, the air-blow air is supplied from the air-blow air supply passage 73 formed in the main-spindle head 25, through the air-blow air supply passage 72 in the rotary joint 71 mounted on the main spindle 26 and the air-blow air supply passage 75 formed in the main spindle 26, to the air-blow air supply passage 65 in the measuring-head body portion 42. Accordingly, the following effect and the like can be obtained. The air-blow air can be supplied from the main-spindle head 25, and there is no need to connect supply means such as a hose for supplying air-blow air, directly to the measuring head 41. Therefore, operations for measurement, such as attachment and detachment of the measuring head 41 to and from the main spindle 26, are facilitated.

Furthermore, the measuring head 41 for an air micrometer of Embodiment 3 is characterized as follows. Specifically, the measuring-head body portion 42 includes: the distal-end-side member (the connection portion 45 and the case 46) to which the measuring-head tip portion 43 is fixed; the proximal-end-side member 54; the coil spring 74 interposed between the distal-end-side member (the connection portion 45 and the case 46) and the proximal-end-side member 54; and the flexible hoses 64A and 64B connecting the measurement air supply passages 55A and 55B formed in the distal-end-side member (the case 46) and the measurement air supply passages 63A and 63B in the proximal-end-side member 54 to each other, respectively. Accordingly, even if the measuring-head tip portion 43 comes into contact with the bush 31 during the insertion of the measuring-head tip portion 43 into the bush hole 31a, the coil spring 74 is compressed to cause the measuring-head tip portion 43 to move toward the proximal end, so that the impact at the time of the contact is mitigated.

Embodiment 4

Figure 19A:
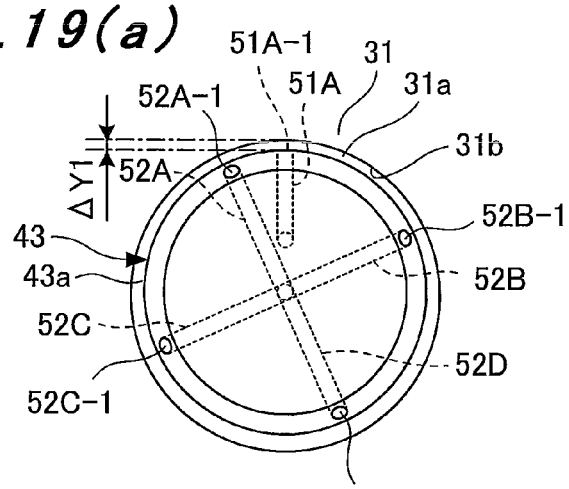
[FIG. 19] Part (a) of FIG. 19 is a view showing how gap measurement is performed by the measuring head (similar to FIG. 5), and Part (b) of FIG. 19 is a view showing a state where the measuring head is rotated by 90 degrees from the state shown in Part (a) of FIG. 19 (similar to FIG. 5).
Figure 19B:
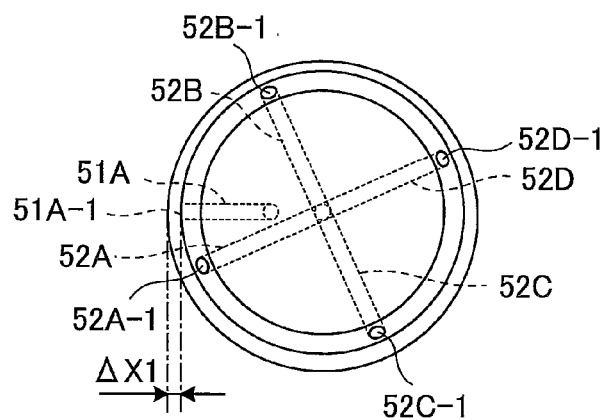
Figure 20:
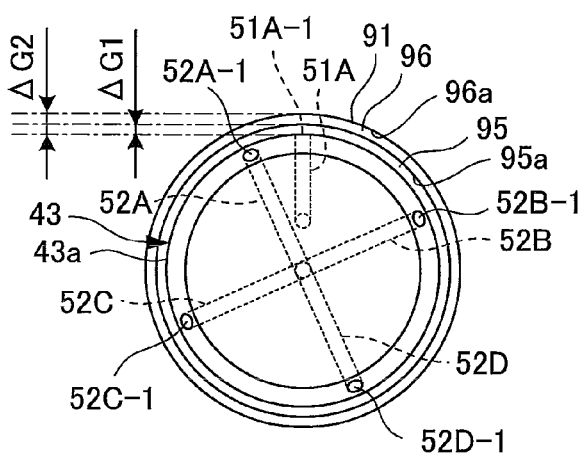
[FIG. 20]

Part (a) of FIG. 18 is a side view of a main part of a measuring head for an air micrometer according to Embodiment 4 of the present invention, Part (b) of FIG. 18 is a view in the direction of the arrow R in Part (a) of FIG. 18, Part (c) of FIG. 18 is a cross-sectional view taken along the line S-S in Part (a) of FIG. 18 and viewed in the direction of the arrows S, and Part (d) of FIG. 18 is a cross-sectional view taken along the line V-V in Part (a) of FIG. 18 and viewed in the direction of the arrow V. Part (a) of FIG. 19 is a view showing how gap measurement is performed by the measuring head (similar to FIG. 5), and Part (b) of FIG. 19 is a view showing a state where the measuring head is rotated by 90 degrees from the state shown in Part (a) of FIG. 19 (similar to FIG. 5). FIG. 20 is a view showing how the measuring head is calibrated using the air-micrometer calibration device (similar to Part (b) of FIG. 8).

It should be noted that an example of a machined tool for which the measuring head of Embodiment 4 is employed and a state where the measuring head is mounted on a main spindle are similar to those shown in Part (a) of FIG. 1 and Part (b) of FIG. 1, respectively, and accordingly will be neither illustrated in drawings nor described in detail herein. In addition, for the calibration of the measuring head of Embodiment 4, the air-micrometer calibration device 91 described in Embodiment 1 is employed (see FIG. 7 and FIG. 8). Therefore, the air-micrometer calibration device will not be described in detail herein. Moreover, in the measuring head of Embodiment 4, the same parts as those in Embodiment 1 will be given the same reference numerals, the detailed description that has already been made will be omitted, and the illustration of the proximal end portion of the measuring-head body portion is omitted.

In the measuring head 41 of Embodiment 1, the two measurement air nozzles 51A and 51B are formed in the measuring-head tip portion 43 (see FIG. 2 and FIG. 3). On the other hand, a measuring head 41 of Embodiment 4 is characterized in that only a single measurement air nozzle 51A is formed in a measuring-head tip portion 43, as shown in Part (a) of FIG. 18 to Part (d) of FIG. 18. Accordingly, the number of measurement air supply passages and the number of hoses in each part, such as a single measurement air supply passage 53A in a connection portion 45 as well as a single measurement air supply passage 55A in a case 46, is one each. The other part has the same configuration as that in Embodiment 1.

In addition, although neither illustrated nor described in detail, the system configuration of an air micrometer and the procedures of operation of gap measurement are also the same as those of Embodiment 1 (see FIG. 4). It should be noted, however, that, since only the single measurement air nozzle 51A is formed in the measuring-head tip portion 43, only a single measurement air supply source and a single A/D converter are provided accordingly. Therefore, Embodiment 4 is different in this point from Embodiment 1.

Moreover, when the gap measurement is performed, the gap $\Delta Y1$ in the Y-axis direction is measured in the state shown in Part (a) of FIG. 19. Subsequently, the measuring head 41 (the measuring-head tip portion 43) is rotated by 90 degrees by the control on a main spindle 26 (see FIG. 1 and FIG. 2) by a NC system 78 (see FIG. 4), whereby the gap $\Delta X1$ in the X-axis direction is measured, as shown in Part (a) of FIG. 19.

Also in this case, as in the case of Embodiment 3, a control device 81 (see FIG. 4) calculates the amounts of eccentricity $\Delta X$ and $\Delta Y$ by subtracting these measured values of the gaps $\Delta X1$ and $\Delta Y1$ from values of gaps which are stored in advance in the control device 81, and which are those between an outer peripheral surface 43a of a measuring-head tip portion 43 and an inner peripheral surface 31b of a bush hole 31a at the time when there is no eccentricity. Specifically, as in the case of Embodiment 3, the amounts of eccentricity $\Delta X$ and ΔY are calculated by any one of the first eccentricity amount calculating method and the second eccentricity amount calculating method described above.

The calibration of the measuring head 41 in Embodiment 4 is the same as that in the case of Embodiment 1. Specifically, the air-micrometer calibration device 91 described in Embodiment 1 is used to obtain data representing the relationship between the gaps ΔG1 and ΔG2 as shown in FIG. 20 and the flow rates of measurement air (see FIG. 6).

As described above, according to the measuring head 41 of Embodiment 4, provided is a measuring head 41 for an air micrometer configured to be mounted on the main spindle 26 of the machine tool 21 at the time of measurement and inserted into the bush hole 31a of the bush 31 attached to the work table 23 of the machine tool 21, for measuring the amount of eccentricity between the bush hole 31a and the main spindle 26. The measuring head 41 for an air micrometer is characterized as follows. Specifically, the measuring head 41 includes: the measuring-head body portion 42; and the measuring-head tip portion 43 provided on the distal end of the measuring-head body portion 42 and configured to be inserted into the bush hole 31a at the time of the measurement. In addition, the single measurement air nozzle 51A is formed to extend in the radial direction of the measuring-head tip portion 43. The first measurement air nozzle 51A is configured to blow measurement air to the gap between the outer peripheral surface 43a of the measuring-head tip portion 43 and the inner peripheral surface 31b of the bush hole 31a through the jetting opening 51A-1 in the outer peripheral surface 43a at the time of measurement. Moreover, the single measurement air supply passage corresponding to the measurement air nozzle 51A (that is, the supply passage constituted of the first measurement air supply passages 53A, 55A, and 63A as well as the hose 64A) is formed in the measuring-head body portion 42. The measurement air is supplied to the single measurement air nozzle 51A from the single measurement supply passage. With the above-described configuration, the measuring head 41 is capable of measuring, not the inner diameter of the bush hole 31a, but the gaps ΔX1 and ΔY1 between the outer peripheral surface 43a of the measuring-head tip portion 43 and the inner peripheral surface 31b of the bush hole 31a in the first radial direction (the X-axis direction) and the second radial direction (the Y-axis direction) to each of which directions the measuring-head tip portion 43 is perpendicular, by rotating the measuring head 41 by 90 degrees by means of the main spindle 26, for example. Accordingly, the amounts of eccentricity ΔX and ΔY between the main spindle 26 and the bush hole 31a are obtained on the basis of the measured values of the gaps ΔX1 and ΔY1 (for example, by subtracting the measured values of the gaps ΔX1 and ΔY1 from values of gaps between the outer peripheral surface of the measuring-head tip portion and the inner peripheral surface of the bush hole at the time when there is no eccentricity), and then, the position of the main spindle 26 is controlled in accordance with the amounts of eccentricity ΔX and ΔY (that is, the relative position between the main spindle 26 and the bush hole 31a is corrected), whereby the axis of the main spindle 26 (the drilling tool 32) and the axis of the bush hole 31a are caused to coincide with each other. Therefore, uneven wear of the bush hole 31a can be prevented.

In addition, the measuring head 41 for an air micrometer of Embodiment 4 is characterized by the following configuration. Specifically, the measurement air is supplied from the measurement air supply passage 70A formed in the main-spindle head 25, through the measurement air supply passage 68A in the rotary joint 67 mounted on the measuring-head body portion 42, to the first measurement air supply passage 63A in the measuring-head body portion 42. Accordingly, the following effect and the like can be obtained. The measurement air can be supplied from the main-spindle head 25, and there is no need to connect such supply means as a hose for supplying measurement air, directly to the measuring head 41. Therefore, operations for measurement, such as attachment and detachment of the measuring head 41 to and from the main spindle 26, are facilitated.

Moreover, the measuring head 41 for an air micrometer of Embodiment 4 is characterized as follows. Specifically, in the measuring-head tip portion 43, the air-blow nozzles 52A to 52D are formed for jetting the air-blow air toward the inner peripheral surface 31b of the bush hole 31a forward through the jetting openings 52A-1 to 52D-1 in the tapered surface 49 on the peripheral edge of the distal end of the measuring-head tip portion 43, at the time of measurement. In the measuring-head body portion 42, the air-blow air supply passages 56 and 65 are formed for supplying the air-blow air to the air-blow nozzles 52A to 52D. Accordingly, even if foreign matter, such as a chip, is attached onto the inner peripheral surface 31b of the bush hole 31a, it is possible to perform the gap measurement after removing the foreign matter from the inner peripheral surface 31b of the bush hole 31a with the air blow, so that highly-precise gap measurement can be performed.

Further, the measuring head 41 for an air micrometer of Embodiment 4 is characterized as follows. Specifically, the air-blow air is supplied from the air-blow air supply passage 73 formed in the main-spindle head 25, through the air-blow air supply passage 72 in the rotary joint 71 mounted on the main spindle 26 and the air-blow air supply passage 75 formed in the main spindle 26, to the air-blow air supply passage 65 in the measuring-head body portion 42. Accordingly, the following effect and the like can be obtained. The air-blow air can be supplied from the main-spindle head 25, and there is no need to connect supply means such as a hose for supplying air-blow air, directly to the measuring head 41. Therefore, operations for measurement, such as attachment and detachment of the measuring head 41 to and from the main spindle 26, are facilitated.

Furthermore, the measuring head 41 for an air micrometer of Embodiment 4 is characterized as follows. Specifically, the measuring-head body portion 42 includes: the distal-end-side member (the connection portion 45 and the case 46) to which the measuring-head tip portion 43 is fixed; the proximal-end-side member 54; the coil spring 74 interposed between the distal-end-side member (the connection portion 45 and the case 46) and the proximal-end-side member 54; and the flexible hose 64A connecting the measurement air supply passages 55A and 55B formed in the distal-end-side member (the case 46) and the measurement air supply passages 63A and 63B in the proximal-end-side member 54 to each other, respectively. Accordingly, even if the measuring-head tip portion 43 comes into contact with the bush 31 during the insertion of the measuring-head tip portion 43 into the bush hole 31a, the coil spring 74 is compressed to cause the measuring-head tip portion 43 to move toward the proximal end, so that the impact at the time of the contact is mitigated.

It should be noted that, a rotary joint for supplying measurement air may be provided in the main spindle so that not only the blow air but also the measurement air would be supplied to the measurement air supply passage in the measuring head through a measurement air supply passage in the rotary joint and the measurement air supply passage in the main spindle.

Moreover, the supply of the air-blow air is not limited to the case where the air-blow air is supplied from the air-blow air supply passage in the main-spindle head, through the air-blow air supply passage in the rotary joint and the air-blow air supply passage in the main spindle, to the air-blow air supply passage in the measuring head, as described above. The air-blow air may be configured to be supplied from an air-blow air supply passage in a main-spindle head, directly or through an air-blow air supply passage in a rotary joint mounted on a measuring head, to an air-blow air supply passage in the measuring head.

INDUSTRIAL APPLICABILITY

The present invention relates to a measuring head for an air micrometer, and is useful when applied to a case where the amount of eccentricity between a bush hole and a main spindle (a drilling tool) in a machine tool.

The invention claimed is:

1. A measuring head for an air micrometer, the measuring head configured to be mounted on a main spindle of a machine tool at the time of measurement and inserted into a bush hole of a bush attached to a work table of the machine tool, for measuring an amount of eccentricity between the bush hole and the main spindle, the measuring head characterized by comprising:
a measuring-head body portion; and
a measuring-head tip portion provided on a distal end of the measuring-head body portion, and configured to be inserted into the bush hole at the time of the measurement the measuring head characterized in that one or a plurality of measurement air nozzles are formed in the measuring-head tip portion the measurement air nozzles configured to blow measurement air to a gap between an outer peripheral surface of the measuring-head tip portion and an inner peripheral surface of the bush hole respectively through jetting openings in the outer peripheral surface at the time of measurement, individual measurement air supply passages corresponding to the respective measurement air nozzles are formed in the measurement-head body portion, the measurement air is supplied to the measurement air nozzles respectively through the individual measurement air supply passages, the measurement air nozzles are a first measurement air nozzle and a second measurement air nozzle each of which is formed to extend in a radial direction of the measuring-head tip portion, and which have an angle of 180 degrees with respect to each other in a circumferential direction of the measuring-head tip portion, the measurement air supply passages are a first measurement air supply passage for supplying the measurement air to the first measurement air nozzle and a second measurement air supply passage for supplying the measurement air to the second measurement air nozzle, and the measurement air is supplied from a first measurement air supply passage and a second measurement air supply passage that are formed in a support portion of the main spindle, through a first measurement air supply passage and a second measurement air supply passage in a rotary joint mounted on the measuring-head body portion, to the first measurement air supply passage and the second measurement air supply passage in the measuring-head body portion, respectively, or the measurement air is supplied from a first measurement air supply passage and a second measurement air supply passage that are formed in a support portion of the main spindle, through a first measurement air supply passage and a second measurement air supply passage in a rotary joint mounted on the main spindle as well as a first measurement air supply passage and a second measurement air supply passage that are formed in the main spindle, to the first measurement air supply passage and the second measurement air supply passage in the measuring-head body portion, respectively.

2. A measuring head for an air micrometer, the measuring head configured to be mounted on a main spindle of a machine tool at the time of measurement and inserted into a bush hole of a bush attached to a work table of the machine tool, for measuring an amount of eccentricity between the bush hole and the main spindle, the measuring head characterized by comprising:
a measuring-head body portion; and
a measuring-head tip portion provided on a distal end of the measuring-head body portion, and configured to be inserted into the bush hole at the time of the measurement, the measuring head characterized in that one or a plurality of measurement air nozzles are formed in the measuring-head tip portion the measurement air nozzles configured to blow measurement air to a gap between an outer peripheral surface of the measuring-head tip portion and an inner peripheral surface of the bush hole respectively through jetting openings in the outer peripheral surface at the time of measurement, individual measurement air supply passages corresponding to the respective measurement air nozzles are formed in the measurement-head body portion, the measurement air is supplied to the measurement air nozzles respectively through the individual measurement air supply passages, the measurement air nozzles are a single measurement air nozzle formed to extend in a radial direction of the measuring-head tip portion, the measurement air supply passages are a single measurement air supply passage for supplying the measurement air to the single measurement air nozzle, and the measurement air is supplied from a measurement air supply passage that is formed in a support portion of the main spindle, through a measurement air supply passage in a rotary joint mounted on the measuring-head body portion, to the measurement air supply passage in the measuring head body portion, or the measurement air is supplied from a measurement air supply passage that is formed in a support portion of the main spindle, through a measurement air supply passage in a rotary joint mounted on the main spindle as well as a measurement air supply passage that is formed in the main spindle, to the measurement air supply passage in the measuring head body portion.

3. A measuring head for an air micrometer, the measuring head configured to be mounted on a main spindle of a machine tool at the time of measurement and inserted into a bush hole of a bush attached to a work table of the machine tool, for measuring an amount of eccentricity between the bush hole and the main spindle, the measuring head characterized by comprising:
a measuring-head body portion; and
a measuring-head tip portion provided on a distal end of the measuring-head body portion, and configured to be inserted into the bush hole at the time of the measurement, the measuring head characterized in that one or a plurality of measurement air nozzles are formed in the measuring-head tip portion, the measurement air nozzles configured to blow measurement air to a gap between an outer peripheral surface of the measuring-head tip portion and an inner peripheral surface of the bush hole respectively through jetting openings in the outer peripheral surface at the time of measurement, individual measurement air supply passages corresponding to the respective measurement air nozzles are formed in the measurement-head body portion, and the measurement air is supplied to the measurement air nozzles respectively through the individual measurement air supply passages, the measuring-head body portion includes:

a distal-end-side member to which the measuring-head tip portion is fixed;

a proximal-end-side member;

an elastic member interposed between the distal-end-side member and the proximal-end-side member; and a flexible hose connecting a measurement air supply passage that is formed in the distal-end-side member and a measurement air supply passage that is formed in the proximal-end-side member to each other.

* * * * *